United States Patent
Song et al.

(10) Patent No.: US 12,078,396 B2
(45) Date of Patent: Sep. 3, 2024

(54) MULTI-AIR CONDITIONER FOR HEATING AND COOLING

(71) Applicant: LG ELECTRONICS INC., Seoul (KR)

(72) Inventors: Chiwoo Song, Seoul (KR); Yongcheol Sa, Seoul (KR); Jiyoung Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 17/378,969

(22) Filed: Jul. 19, 2021

(65) Prior Publication Data

US 2022/0018581 A1    Jan. 20, 2022

(30) Foreign Application Priority Data

Jul. 20, 2020 (KR) .......................... 10-2020-0089887

(51) Int. Cl.
*F25B 49/02*    (2006.01)
*F25B 13/00*    (2006.01)
(Continued)

(52) U.S. Cl.
CPC .............. *F25B 49/02* (2013.01); *F25B 13/00* (2013.01); *F25B 39/00* (2013.01); *F25B 41/31* (2021.01);
(Continued)

(58) Field of Classification Search
CPC .. F25B 5/02; F25B 2500/02; F25B 2400/061; F25B 2313/025; F25B 2313/0251;
(Continued)

(56) References Cited

U.S. PATENT DOCUMENTS

| | | |
|---|---|---|
| 2014/0116078 A1 | 5/2014 | Doumyou et al. |
| 2016/0178249 A1 | 6/2016 | Kwon et al. |
| 2017/0191715 A1 | 7/2017 | Yang et al. |

FOREIGN PATENT DOCUMENTS

| | | |
|---|---|---|
| CA | 3030477 | 7/2019 |
| CN | 102563962 | 7/2012 |

(Continued)

OTHER PUBLICATIONS

JP 2020026945 English Translation (Year: 2020).*
(Continued)

*Primary Examiner* — David J Teitelbaum
*Assistant Examiner* — Devon Moore
(74) *Attorney, Agent, or Firm* — KED & ASSOCIATES, LLP

(57) ABSTRACT

A multi-air conditioner for heating and cooling may include at least one indoor unit for both cooling and heating including an indoor heat exchanger, an outdoor unit, and a distributor disposed between the outdoor unit and the at least one indoor unit. The outdoor unit may include a compressor, a plurality of outdoor heat exchangers, and a switching unit disposed on a discharge side of the compressor to switch a flow of refrigerant. The plurality of outdoor heat exchangers may include a first heat exchanger, a second heat exchanger disposed under the first heat exchanger, and a third heat exchanger disposed under the second heat exchanger. A first end of the third heat exchanger may be connected to the discharge side of the compressor, and a second end of the third heat exchanger may be connected to the indoor unit.

13 Claims, 14 Drawing Sheets

(51) Int. Cl.
*F25B 39/00* (2006.01)
*F25B 41/31* (2021.01)
*F25B 41/40* (2021.01)

(52) U.S. Cl.
CPC .... *F25B 41/40* (2021.01); *F25B 2313/02741* (2013.01); *F25B 2600/2513* (2013.01); *F25B 2700/02* (2013.01); *F25B 2700/1931* (2013.01); *F25B 2700/2103* (2013.01); *F25B 2700/2104* (2013.01); *F25B 2700/2106* (2013.01)

(58) Field of Classification Search
CPC .... F25B 2313/0252; F25B 2313/02521; F25B 2313/02522; F25B 2313/02523; F25B 2313/0253; F25B 2313/02531; F25B 2313/02532; F25B 2313/02533; F25B 41/31; F25B 6/02
See application file for complete search history.

(56) References Cited

FOREIGN PATENT DOCUMENTS

| CN | 102767876 | 11/2012 | | |
|----|-----------|---------|---|---|
| EP | 3 203 165 | 8/2017 | | |
| JP | S63-286664 | 11/1988 | | |
| JP | H5-312428 | 11/1993 | | |
| JP | H6-341740 | 12/1994 | | |
| JP | H11-182995 | 7/1999 | | |
| JP | 2002-362359 | 12/2002 | | |
| JP | 2011-174639 | 9/2011 | | |
| JP | 2013-122354 | 6/2013 | | |
| JP | 2016-57051 | 4/2016 | | |
| JP | 2018-087688 | 6/2018 | | |
| JP | 2020-26945 | 2/2020 | | |
| KR | 10-2016-0074373 | 6/2016 | | |
| KR | 10-2017-0090290 | 8/2017 | | |
| WO | WO-2013001976 A1 | * | 1/2013 | ............. F24F 11/02 |
| WO | WO-2018008139 A1 | * | 1/2018 | ............. F25B 13/00 |

OTHER PUBLICATIONS

JP 2013122354 English Translation (Year: 2013).*
JP 2002362359 English Translation (Year: 2002).*
JPH05312428 English Translation (Year: 1993).*
JPS63286664 English Translation (Year: 1988).*
JP 2016057051 English Translation (Year: 2016).*
WO 2018008139 English Translation (Year: 2018).*
WO-2013001976-A1 English Translation (Year: 2013).*
Japanese Office Action dated May 31, 2022 issued in Application No. 2021-119377.
Chinese Office Action dated Aug. 17, 2022 issued in Application No. 202110821821.1.
European Search Report issued in Application No. 21186380.8 dated Nov. 30, 2021.

* cited by examiner

MULTI-AIR CONDITIONER FOR HEATING AND COOLING

CROSS-REFERENCE TO RELATED APPLICATION(S)

This application claims priority under 35 U.S.C. § 119 to Korean Application No. 10-2020-0089887, filed in Korea on Jul. 20, 2020, whose entire disclosure is hereby incorporated by reference.

BACKGROUND

1. Field

A multi-air conditioner for heating and cooling is disclosed herein.

2. Background

Generally, a multi-air conditioner is an air conditioner in which a plurality of indoor units is connected to a single outdoor unit, and which uses the common outdoor unit and the plurality of indoor units each as a cooler or a heater. A recent trend is that a plurality of outdoor units is connected in parallel to each other so as to effectively cope with a cooling or heating load, corresponding to the number of indoor units in operation.

A multi-air conditioner according to the conventional art includes a plurality of outdoor units, a plurality of indoor units, and refrigerant piping that connects the plurality of outdoor units and indoor units. The plurality of outdoor units is comprised of a main outdoor unit and a plurality of sub outdoor units.

Each of the plurality of outdoor units is provided with a compressor that compresses a low-temperature, low-pressure gas refrigerant into a high temperature and high pressure, an outdoor heat exchanger that exchanges circulating refrigerant with outdoor air, and a four-way valve that switches a flow of refrigerant depending on a cooling or heating operation. An expansion mechanism and an indoor heat exchanger that exchanges heat between circulating refrigerant and indoor air are installed on each of the plurality of indoor units.

With this configuration, when the multi-air air conditioner according to the conventional art is in a cooling operation, refrigerant compressed in the compressors of the main outdoor unit and sub outdoor units is sent to the outdoor heat exchanger by the four-way valve, and refrigerant passing through the outdoor heat exchanger is condensed through heat exchange with ambient air and then sent to the expansion mechanism. Refrigerant expanded in the expansion mechanism is introduced into the indoor heat exchanger and evaporates as it absorbs heat from indoor air, thereby cooling the indoor space. On the other hand, in a heating operation, a direction of flow is switched by the four-way valve, and refrigerant discharged from the compressor passes successively through the four-way valve, the indoor heat exchanger, an outdoor electronic expansion valve (or linear expansion valve (LEV)), and the outdoor heat exchanger, thereby heating the indoor space.

For example, Japanese Unexamined Patent Application No. JP2018-087688A, which is hereby incorporated by reference, discloses an air conditioner that allows refrigerant discharged to a compressor to pass through an outdoor heat exchanger, turn into liquid refrigerant, and flow to a plurality of indoor heat exchangers. In this conventional art technology, a pressure and discharge temperature are regulated by an electronic expansion valve which is installed between a liquid pipe and a compressor suction pipeline and controlled according to operating conditions. However, such a multi-air conditioner for heating and cooling is problematic in that refrigerant remains in a high-pressure gas pipeline when all rooms need cooling.

Moreover, if indoor and outdoor temperatures are high and an indoor load is small, a continuous heating operation may not be performed, and if indoor and outdoor temperatures are low and an indoor load is small, a continuous cooling operation may not be performed. In addition, some space may need cooling when indoor and outdoor temperatures are low. In this instance, if the temperature of refrigerant supplied to an indoor unit is dropped too low for cooling, the indoor unit may freeze.

BRIEF DESCRIPTION OF THE DRAWINGS

Embodiments will be described in detail with reference to the following drawings in which like reference numerals refer to like elements, and wherein.

DETAILED DESCRIPTION

Figure 1:
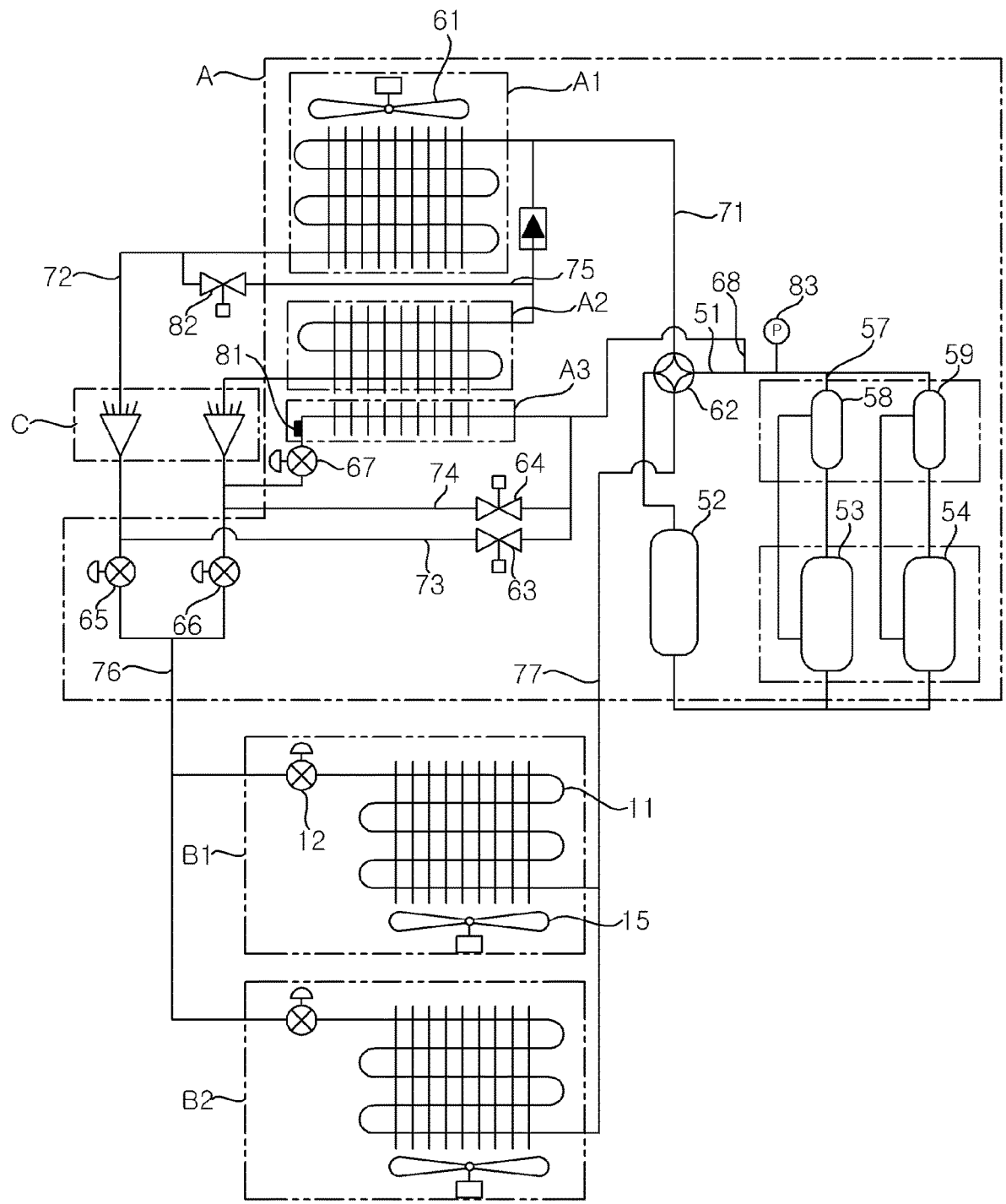
FIG. 1 is a schematic diagram of a multi-air conditioner for heating and cooling according to an embodiment.

Embodiments are described hereinafter with reference to the accompanying drawings. However, embodiments are not limited to the disclosed embodiments and may be implemented in various different forms. The embodiments are provided merely for complete disclosure and to fully convey the scope to those of ordinary skill in the art to which the embodiments pertain. The embodiments are defined only by the scope of the claims. Like reference numerals refer to like elements throughout the specification.

Spatially relative terms, such as "below," "beneath," "lower," "above," "upper" and the like, may be used herein for ease of description to describe one element's relationship to other elements as illustrated in the figures. It will be understood that the spatially relative terms are intended to encompass different orientations of the element in use or operation in addition to the orientation depicted in the figures. For example, if the element in the figures is turned over, elements described as "below" or "beneath" other elements would then be oriented "above" the other elements. Thus, the exemplary term "below" can encompass both an orientation of above and below. The element may be otherwise oriented, and the spatially relative descriptors used herein may be interpreted accordingly.

The terminology used herein is for the purpose of describing particular embodiments only and is not intended to be limiting. As used herein, the singular forms "a," "an," and "the" are intended to include the plural forms as well, unless the context clearly indicates otherwise. The term "comprise" and/or "comprising" used herein specify the existence of stated components, steps, and/operations, but do not preclude the existence or addition of one or more components, steps, and/or operations thereof.

Unless otherwise defined, all terms (including technical and scientific terms) used herein have the same meanings as those commonly understood by one of ordinary skill in the art. It will be further understood that terms such as those defined in commonly used dictionaries should be interpreted as having meanings consistent with their meanings in the context of the relevant art and the present disclosure, and are not to be interpreted in an idealized or overly formal sense unless expressly so defined herein.

In the drawings, the thickness or size of each element may be exaggerated, omitted, or schematically illustrated for convenience of description and clarity. Also, the size or area of each element may not entirely reflect the actual size thereof.

Hereinafter, embodiments will be described with reference to the accompanying drawings.

FIG. 1 is a schematic diagram of a multi-air conditioner for heating and cooling according to an embodiment. Referring to FIG. 1, a multi-air conditioner 100 for heating and cooling according to an embodiment may include a plurality of indoor units B1, B2, . . . for both cooling and heating, at least one outdoor unit A for both cooling and heating, and a distributor C. The outdoor unit A for both cooling and heating may include first and second compressors 53 and 54, a plurality of outdoor heat exchangers A1, A2, and A3, an outdoor heat exchanger fan 61, and a switching unit. The switching unit may include a four-way valve 62. Suction portions of the first and second compressors 53 and 54 may be connected by a common accumulator 52. The first compressor 53 may be an inverter compressor capable of varying refrigerant compression capacity, and the second compressor 54 may be a constant-speed compressor whose refrigerant compression capacity is constant.

First and second discharge pipelines may be connected to discharge portions of the first and second compressors 53 and 54, the first and second discharge pipelines may be joined together by a joint 57, and first and second oil separators 58 and 59 may be installed on the first and second discharge pipelines, respectively, to collect oil contained in refrigerant discharged from the first and second compressors 53 and 54. First and second oil collecting pipes may be connected to the first and second oil separators 58 and 59 to guide oil separated by the first and second oil separators 58 and 59 to the suction portions of the first and second compressors 53 and 54.

A high-pressure gas pipeline 68 may be connected to the joint 57 to bypass the refrigerant discharged from the first and second compressors 53 and 54 without passing it through the four-way valve 62. Also, the joint 57 may be connected to the four-way valve 62 by a third discharge pipeline 51.

The outdoor heat exchangers A1, A2, and A3 may be connected to the four-way valve 62 by a first connecting pipeline 71. Refrigerant condenses or evaporates in the outdoor heat exchangers A1, A2, and A3 through heat exchange with outside air. The outdoor unit fan 61 draws air into the outdoor heat exchangers A1, A2, and A3 in order to facilitate the heat exchange. In the multi-air conditioner 100 for heating and cooling, the outdoor heat exchangers A1, A2, and A3 are used as condensers during a cooling or defrosting operation, and the outdoor heat exchangers A1, A2, and A3 are used as evaporators during a heating operation.

Such outdoor heat exchangers A1, A2, and A3 have a multi-layered structure as shown in FIG. 1. More specifically, the outdoor heat exchangers A1, A2, and A3 according to an embodiment may include a plurality of heat exchangers A1, A2, and A3 within a single outdoor unit A, which have a multi-layered structure and may be coupled to or decoupled from each other.

Such a plurality of outdoor heat exchangers A1, A2, and A3 may have, but are not limited to, a three-layer structure of a first heat exchanger A1, a second heat exchanger A2, and a third heat exchanger A3, as shown in FIG. 1. The first heat exchanger A1 may be a main heat exchanger, which may be positioned highest among the outdoor heat exchangers A1, A2, and A3 and connected to the first connecting pipe 71. The second heat exchanger A2 may be a sub heat exchanger, which may be positioned in a same layer as the first heat exchanger A1 or under it, and a first end of which may be connected serially to the first heat exchanger A1 and a second end of which may be connected to the distributor C. A check valve may be located between the first end of the first heat exchanger A1 and the first end of the second heat exchanger A2, in order to prevent a parallel connection between the first heat exchanger A1 and the second heat exchanger A2. The second heat exchanger A2 may have a shorter flow path than the first heat exchanger A1, and may be located under the first heat exchanger A1 in a physical sense and selectively operated depending on a cooling or heating load.

A second connecting pipeline 75 that connects the second end of the first heat exchanger A1 and the first end of the second heat exchanger A2 may be formed for a serial connection between the first heat exchanger A1 and the second heat exchanger A2, and a first connecting valve 82 may be formed on the second connecting pipeline 75 to couple or decouple the two heat exchangers A1 and A2.

The third heat exchanger A3 may be located under the second heat exchanger A2. The third heat exchanger A3 may be a bypass heat exchanger, which may be connected to the high-pressure gas pipeline 68 to condense and bypass a portion of high-pressure gas refrigerant from the compressors 53 and 54 and join a liquid pipeline 76 to move liquid refrigerant to the indoor units B1 and B2.

The first end of the third heat exchanger A3 may be connected to the high-pressure gas pipeline 68 and then to discharge sides of the compressors 53 and 54, and the second end may be connected to the distributor C and the indoor units B1 and B2. Such a third heat exchanger A3 may have a shorter flow path than the second heat exchanger A2.

Flow paths of the first, second, and third heat exchangers A1, A2, and A3 may get sequentially shorter; that is, of the entire flow path length, the flow path of the first heat exchanger A1 may comprise 65 to 75%, the flow path of the second heat exchanger A2 may comprise 20 to 30%, and the flow path of the third heat exchanger A3 may comprise 3 to 10%. Moreover, of the entire flow path length, the first heat exchanger A1 may comprise 70%, the second heat exchanger A2 may comprise 25%, and the third heat exchanger A3 may comprise 5%.

Outdoor electronic expansion valves 65, 66, and 67 may be installed on the liquid pipeline 76 where liquid refrigerant discharged from the outdoor heat exchangers A1, A2, and A3 flows. The outdoor electronic expansion valves 65, 66, and 67 expand refrigerants during a heating or defrosting operation. The outdoor electronic expansion valves 65, 66, and 67 may include first electronic expansion valve 65 connected to the second end of the first heat exchanger A1, second electronic expansion valve 66 connected to the second end of the second heat exchanger A2, and third electronic expansion valve 67 connected to the second end of the third heat exchanger A3.

With the plurality of outdoor heat exchangers A1, A2, and A3 thus configured, a first sub pipeline 73 that connects the high-pressure gas pipeline 68 and the second end of the first heat exchanger A1 and a second sub pipeline 74 that connects the high-pressure gas pipeline 68 and the second end of the second heat exchanger A2 may be further included so as to perform split defrosting during a heating operation, and a first sub valve 63 and a second sub valve 64 provided on their respective sub valves 73 and 74 may be further included so as to direct high-pressure gas refrigerant to the sub pipelines 73 and 74 or block it.

Also, the outdoor heat exchanger according to an embodiment may further include a subcooling unit (not shown). The subcooling unit may cool refrigerant flowing to the distributor C during a cooling operation.

In this way, the plurality of heat exchangers A1, A2, and A3 form a layered structure within a single outdoor unit A, and lengths of their flow paths may be varied by selectively operating them depending on the load of the indoor heat exchanger B1 and the operation mode, thereby optimizing heat efficiency.

The distributor C may be connected to the second end of each heat exchanger A1, A2, and A3. The distributor C may be located between the outdoor unit A and the plurality of indoor units B1 and B2 and distribute refrigerant to the indoor units B1 and B2 according to operating conditions, such as cooling, heating, and defrosting, for example. The distributor C may include, but is not limited to, a high-pressure gas header, a low-pressure gas header, a liquid header, and control valves (not shown).

Although FIG. 1 illustrates that the distributor C is located between the electronic expansion valves 65 and 66 and the heat exchangers A1, A2, and A3, they may be located at a rear of the electronic expansion valves 65 and 66.

The first and second indoor units B1, B2, . . . for both cooling and heating may be disposed in different spaces, and each of the indoor units B1, B2, . . . may include an indoor heat exchanger 11, indoor electronic expansion valves 12, and an indoor unit fan 15. The indoor electronic expansion valves 12 may be installed on indoor that connect pipelines (not shown because they are connected to the liquid pipeline 76) that connects the indoor heat exchangers 11 and the high-pressure gas header. Moreover, respective temperature sensors may be installed to detect a temperature of refrigerant discharged from the first and second indoor units B1, B2, . . . , and a temperature sensor that detects temperatures of the indoor units B1 and B2 may be further included to measure indoor temperatures.

In this way, the heat exchangers A1, A2, and A3 within a single outdoor unit A are configured to form a layered structure in which they may be coupled to or decoupled from each other. Thus, the outdoor heat exchangers A1, A2, and A3 may be selectively coupled depending on the indoor unit load, thereby preventing unnecessary operation of the outdoor unit and allowing for operation in an optimal mode according to the situation.

As for a connection between the outdoor heat exchangers A1, A2, and A3, the user may select a particular mode depending on indoor and outdoor conditions, that is, indoor and outdoor temperatures and humidity levels, and the particular mode may be divided into specific modes according to the current status. Depending on the different modes, the separate outdoor heat exchangers A1, A2, and A3 may be coupled or decoupled, and the flow of refrigerant may change accordingly.

The outdoor heat exchangers A1, A2, and A3 according to an embodiment may further include a temperature sensor 81 on a pipeline at the second end, that is, the discharge end, of the third heat exchanger A3 at a lowest layer, and may further include a pressure sensor 83 on the joint 57.

Although the second heat exchanger A2 is illustrated as a single layer, it may also be comprised of multiple layers which may be connected in series. Thus, a capacity of the outdoor heat exchangers A1, A2, and A3 may be set to an optimum number, depending on the load of the indoor units B1, B2, . . . .

Moreover, the outdoor heat exchangers A1, A2, and A3 according to embodiments are capable of adjusting an amount of high-pressure gas refrigerant flowing from the compressors 53 and 54 to the indoor units B1 and B2 as the third heat exchanger A3 for bypass is positioned at the lowest layer. Thus, in a case in which the amount of refrigerant required is not large (that is, heating overload, for example), the high-pressure gas refrigerant may be bypassed to the heat exchangers A1, A2, and A3 of the outdoor unit A, thereby adjusting the amount of refrigerant introduced into the indoor units B1 and B2. Therefore, it is possible to avoid the risk of leakage indoors due to an excessive amount of refrigerant, which overall may minimize the amount of refrigerant leakage.

In order to perform specific modes of operation as described above, the multi-air conditioner 100 for heating and cooling according to an embodiment may include a controller (not shown). The controller may be installed within the outdoor unit A, or may be implemented as a processor within a manager management system. Alternatively, a controller that performs an operation according to a selected specific mode may be disposed within the outdoor unit A, and a main controller may be installed in the manager management system to send and receive information to and from the controller. Detailed description of variations of the controller have been omitted.

The controller may receive an operation selection command from the user, and receive information on current indoor and outdoor temperatures and humidity levels from the temperature sensors and humidity sensors disposed in the indoor unit B and outdoor unit A. The controller may select an optimum specific mode of operation based on the received information on indoor and outdoor temperature and humidity levels and the mode of operation selected by the user, and control operations of the valves 63, 64, 65, 66, 67, and 68 of the multi-air conditioner 100 for heating and cooling, operations of the compressors 53 and 54, and operation of the accumulator 52, and operations of the sensors, for example, according to the selected specific mode of operation.

Hereinafter, operations of the outdoor unit A and the indoor units B1 and B2 according to different modes of operation and the corresponding flow of refrigerant will be described.

Referring to FIGS. 2 through 5, the operation of the multi-air conditioner 100 for heating and cooling shown in FIG. 1 and the corresponding flow of air will be described below.

Figure 2:
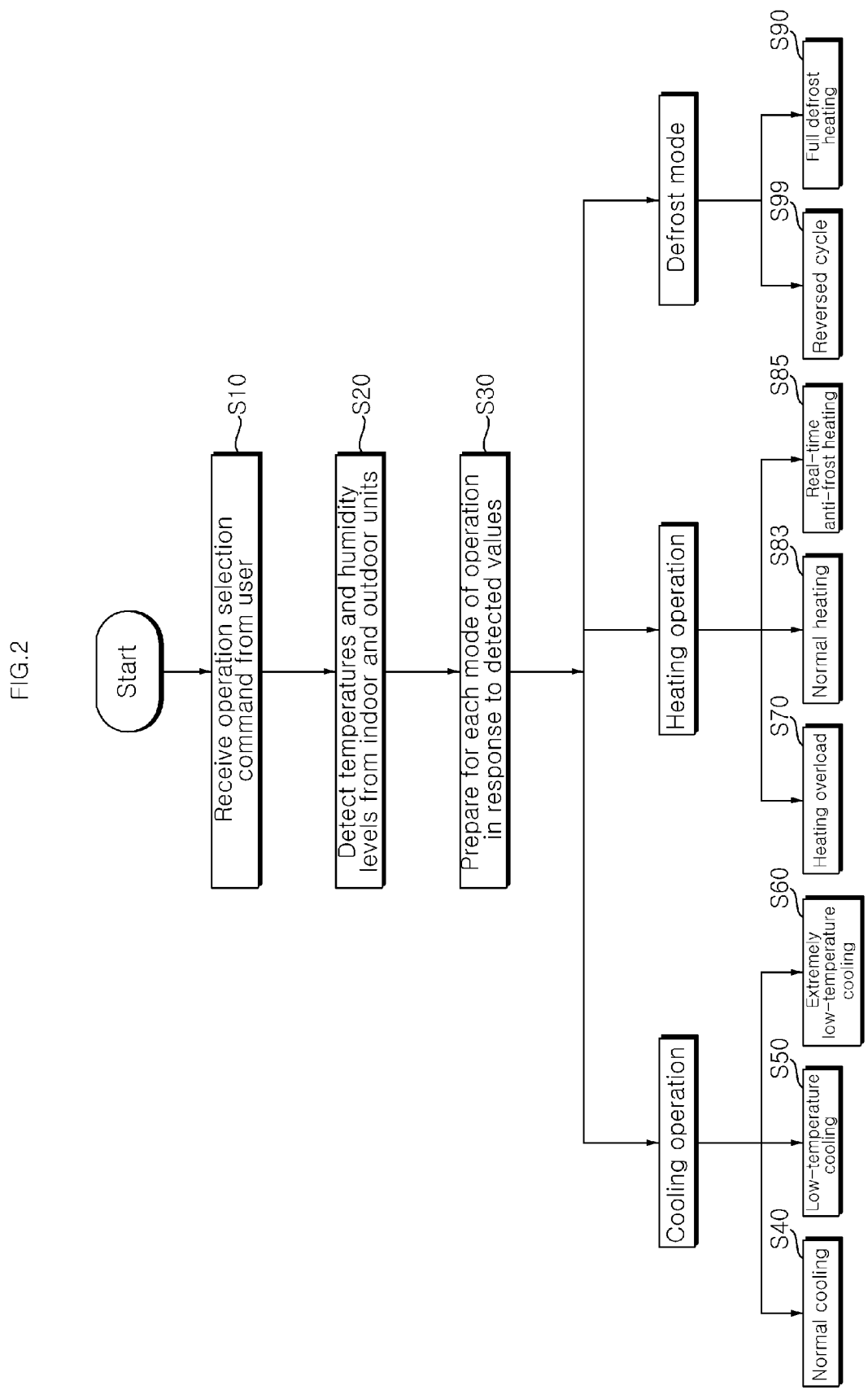
FIG. 2 is a flowchart of an entire operational sequence for modes of the multi-air conditioner for heating and cooling of FIG. 1.
Figure 3:
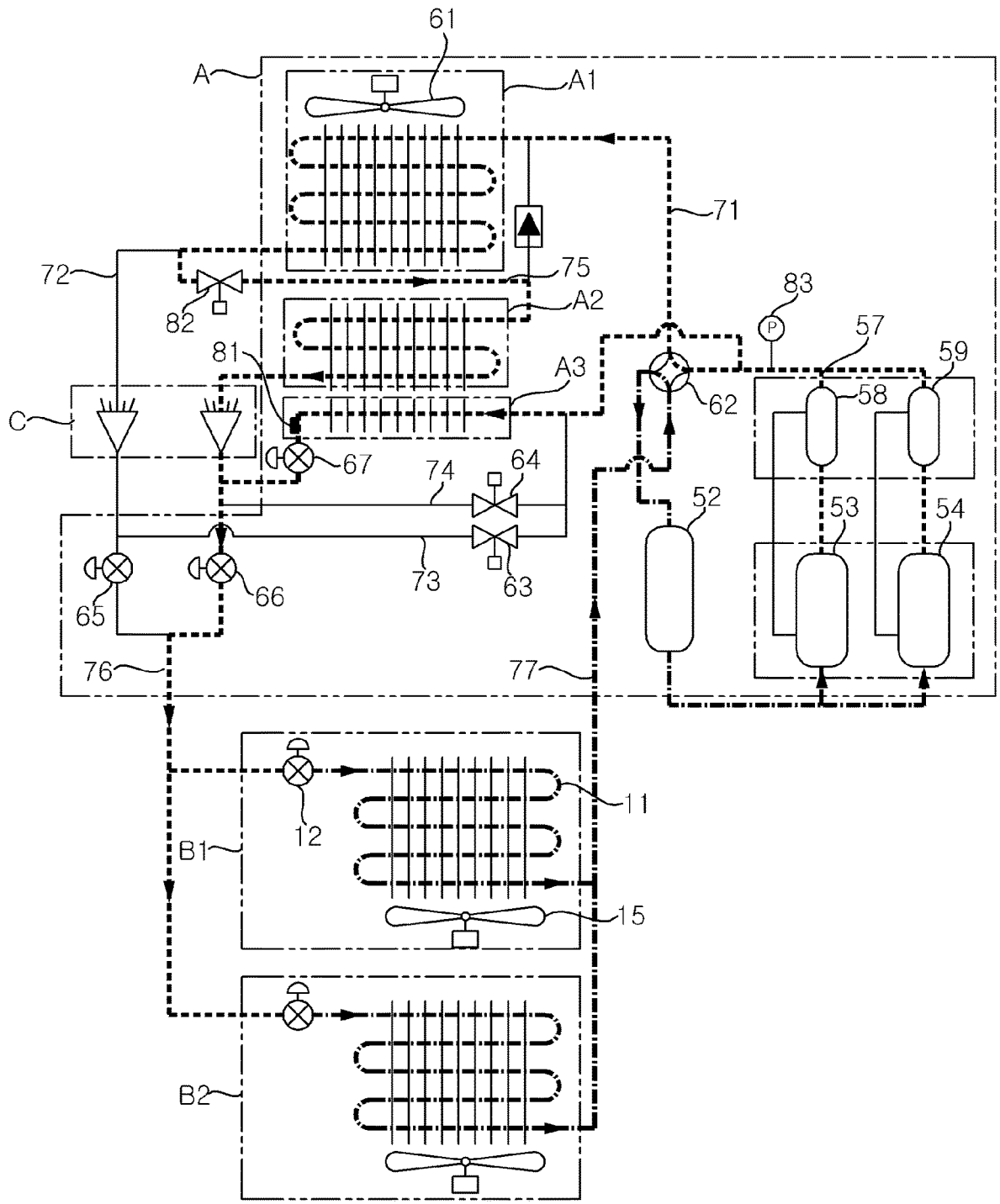
FIG. 3 is an operation diagram illustrating an operating state of the multi-air conditioner for heating and cooling of FIG. 1 during a normal cooling operation.
Figure 4:
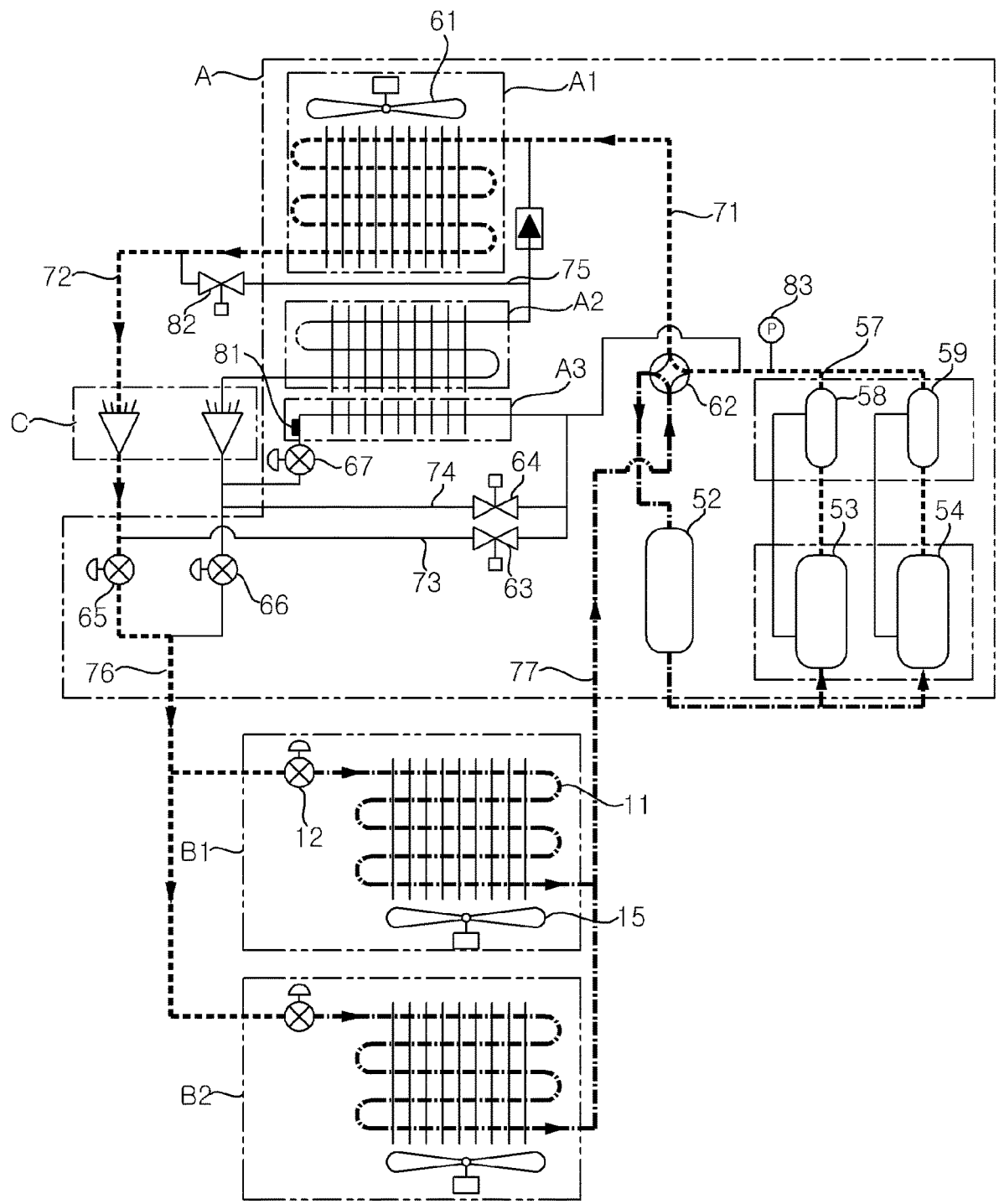
FIG. 4 is an operation diagram illustrating an operating state of the multi-air conditioner for heating and cooling of FIG. 1 during a low-temperature cooling operation.
Figure 5:
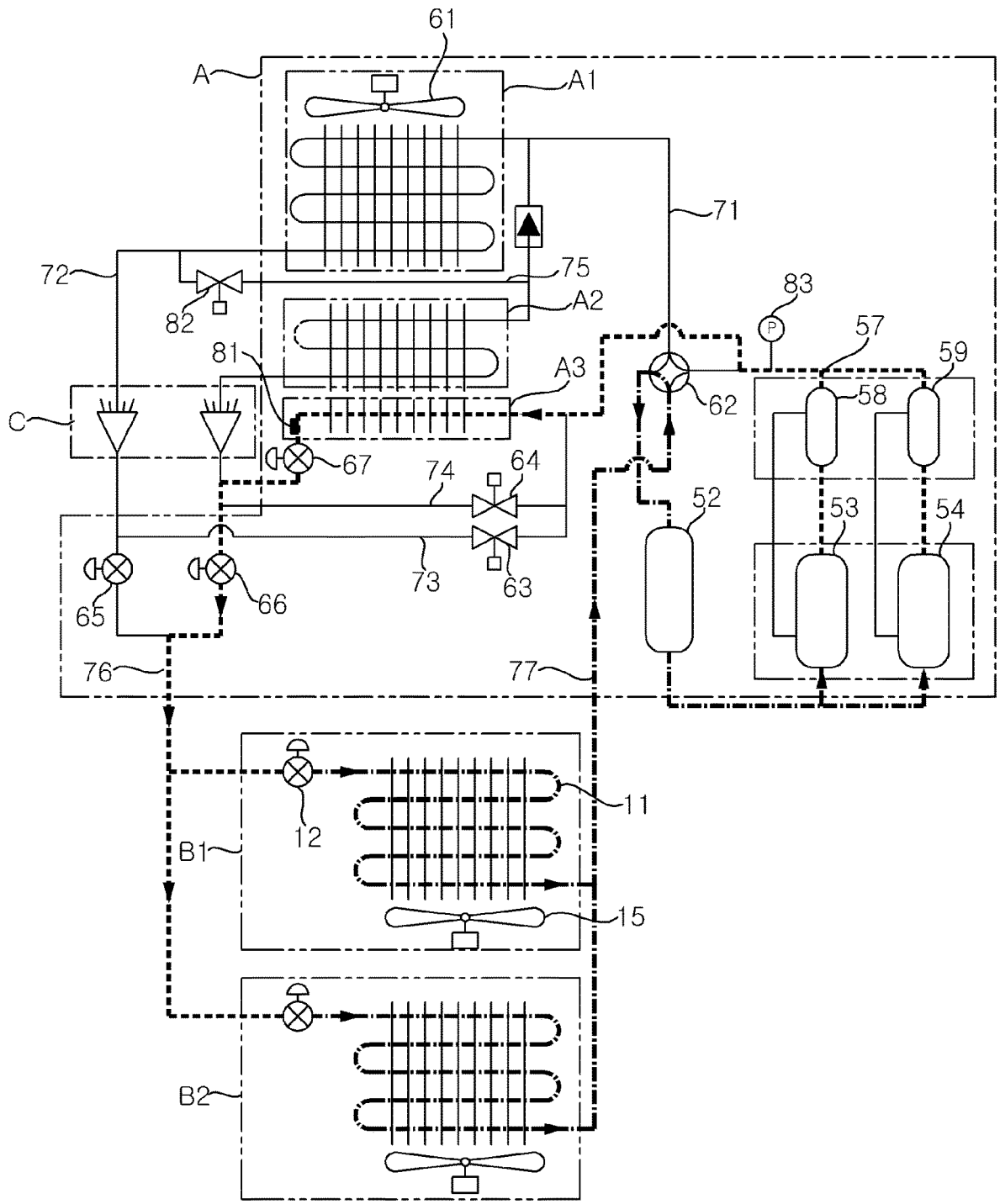
FIG. 5 is an operation diagram illustrating an operating state of the multi-air conditioner for heating and cooling of FIG. 1 during an extremely low-temperature cooling operation.

FIG. 2 is a flowchart of an entire process for modes of the multi-air conditioner 100 for heating and cooling of FIG. 1. FIG. 3 is an operation diagram illustrating an operating state of the multi-air conditioner 100 for heating and cooling of FIG. 1 during a normal cooling operation. FIG. 4 is an operation diagram illustrating an operating state of the multi-air conditioner 100 for heating and cooling of FIG. 1 during a low-temperature cooling operation. FIG. 5 is an operation diagram illustrating an operating state of the multi-air conditioner 100 for heating and cooling of FIG. 1 during an extremely low-temperature cooling operation.

Referring to FIG. 2, the multi-air conditioner 100 for heating and cooling according to an embodiment starts operating upon receiving an operation selection command from the user (S10). That is, once the user selects a mode of operation for the indoor unit B installed in a particular space, the controller (not shown) installed in the outdoor unit A selects a specific mode of operation to start operation in the selected specific mode of operation. The user may select a cooling or heating operation for the indoor unit B in the particular space as they require.

Upon receiving the operation selection command from the user, the controller receives information on current indoor and outdoor temperatures and humidity levels from the temperature sensors and humidity sensors disposed in the indoor unit B and outdoor unit A (S20). In this instance, the controller selects an optimum specific mode of operation based on the received information on indoor and outdoor temperatures and humidity levels and the mode of operation selected by the user, and prepares for operation in the selected mode of operation (S30).

If the user's operation selection command indicates a cooling operation, the controller may select one from among a normal cooling mode (S40), a low-temperature cooling mode (S50), and an extremely low-temperature cooling mode (S60) depending on the indoor and outdoor temperatures and humidity levels.

In the drawings, the broken lines represent the flow of high-temperature refrigerant, and the dashed-dotted line represents the flow of low-temperature refrigerant.

More specifically, a normal cooling mode operation may be executed when the outdoor temperature is 5 degrees below zero or lower and the indoor temperature is 20 degrees or higher. Referring to FIG. 3, in the normal cooling mode, high-pressure, high-temperature gas refrigerant discharged from the first and second compressors 53 and 54 flows through the first and second discharge pipelines, passes through the four-way valve 62 and then the first connecting pipeline 71, and enters the first heat exchanger A1 of the outdoor unit A. At this point, as the first connecting valve 82 is opened, the first heat exchanger A1 and the second heat exchanger A2 are connected in series. Thus, refrigerant flowing through the first heat exchanger A1 is further condensed as it exchanges heat in the second heat exchanger A2. The condensed high-pressure liquid refrigerant passes through the subcooling unit (not shown) and then the distributor C, and refrigerant discharged through the first and second indoor connecting pipelines expands in the indoor electronic expansion valves 12 and then evaporates in the indoor heat exchangers 11. Next, the refrigerant in low-temperature and low-pressure state is introduced into suction and discharge pipeline 77, passes through the accumulator 52, and is then drawn into the first and second compressors 53 and 54.

In the normal cooling operation, the third electronic expansion valve 67 at the bottom is opened so that a flow of refrigerant to be condensed in the third heat exchanger A3 is directed to flow to the third heat exchanger A3, and at the same time, a refrigerant from the compressors 53 and 54 passes through the third heat exchanger A3 and enters the indoor unit B. Accordingly, heat exchange may be done in such a way as to meet a large load involving the plurality of indoor units B1 and B2 by making the utmost use of the capacity of the heat exchangers A1, A2, and A3 of the outdoor unit A.

Next, the controller may execute an extremely low-temperature cooling mode operation if the outdoor temperature is between 0 and 10 degrees below zero, the indoor temperature is above 20 to 22 degrees, and a predetermined number n or fewer indoor units have received a cooling operation command (S50).

Referring to FIG. 4, in the low-temperature cooling mode, a predetermined number n or fewer indoor units need a cooling operation, which means that the actual cooling load is not large. In the low-temperature cooling mode, the outdoor heat exchangers A1, A2, and A3 need to be operated at as low capacity as possible to create a cycle with increased condensation pressure. To implement this, only the first heat exchanger A1 of the outdoor unit A is utilized for condensation, and no refrigerant is directed into the second and third heat exchangers A2 and A3.

More specifically, high-pressure gas refrigerant discharged from the first and second compressors 53 and 54 flows through the first and second discharge pipelines, passes through the four-way valve 62, and is then introduced into the first heat exchanger A1 of the outdoor unit A. In this instance, the first connecting valve 82 is closed to cut off the connection between the first heat exchanger A1 and the second heat exchanger A2.

Refrigerant flowing through the first heat exchanger A1 is condensed through heat exchange, and the condensed high-pressure liquid refrigerant passes through the subcooling unit and then the distributor C and is then discharged through the first and second indoor connecting pipelines. The discharged refrigerant expands in the indoor electronic expansion valves 12 and then evaporates in the indoor heat exchangers 11. Next, the refrigerant in low-temperature and low-pressure state is introduced into the suction and discharge pipeline 77, passes through the accumulator 52, and is then drawn into the first and second compressors 53 and 54.

In the low-temperature cooling operation, the third electronic expansion valve 67 at the bottom is shut off, so that no refrigerant flows into the third heat exchanger A3. Accordingly, heat exchange may be done in such a way as to meet the current load of the indoor unit B by reducing the capacity of the heat exchangers A1, A2, and A3 of the outdoor unit A.

If the outdoor temperature is between 10 and 20 degrees below zero, the indoor temperature is above 20 to 22 degrees, and a predetermined number m or fewer indoor units have received a cooling operation command, the controller may execute the extremely low-temperature cooling mode operation (S60). Referring to FIG. 5, in the extremely low-temperature cooling mode, a predetermined number m (m is an integer less than n) or fewer indoor units need a cooling operation, which means that the actual cooling load is not very low. In the extremely low-temperature cooling mode, the outdoor heat exchangers A1, A2, and A3 need to be operated at minimum capacity to create a cycle with increased condensation pressure. To implement this, only the third heat exchanger A3 of the outdoor unit A is utilized for condensation, and no refrigerant is directed into the first and third heat exchangers A1 and A3.

More specifically, high-pressure gas refrigerant discharged from the first and second compressors 53 and 54 flows through the first and second discharge pipelines, passes through the high-pressure gas pipeline 68, and is then introduced into the third heat exchanger A3 of the outdoor unit A. In this instance, the third electronic expansion valve 67 is opened to direct the refrigerant into the third heat exchanger A3 and condense it there.

Refrigerant flowing through the third heat exchanger A3 is condensed through heat exchange, and the condensed high-pressure liquid refrigerant is discharged through the first and second indoor connecting pipelines. The discharged refrigerant expands in the indoor electronic expansion valves 12 and then evaporates in the indoor heat exchangers 11. Next, the refrigerant in low-pressure state is introduced into the suction and discharge pipeline 77, passes through the accumulator 52, and is then drawn into the first and second compressors 53 and 54.

In the extremely low-temperature cooling operation, the first and second electronic expansion valves 65 and 66 are shut off, so that no refrigerant flows into the first and second heat exchangers A1 and A2 located above them. Accordingly, heat exchange may be done in such a way as to meet the current load of the indoor unit B by reducing the capacity of the heat exchangers A1, A2, and A3 of the outdoor unit A to a minimum.

Figure 6:
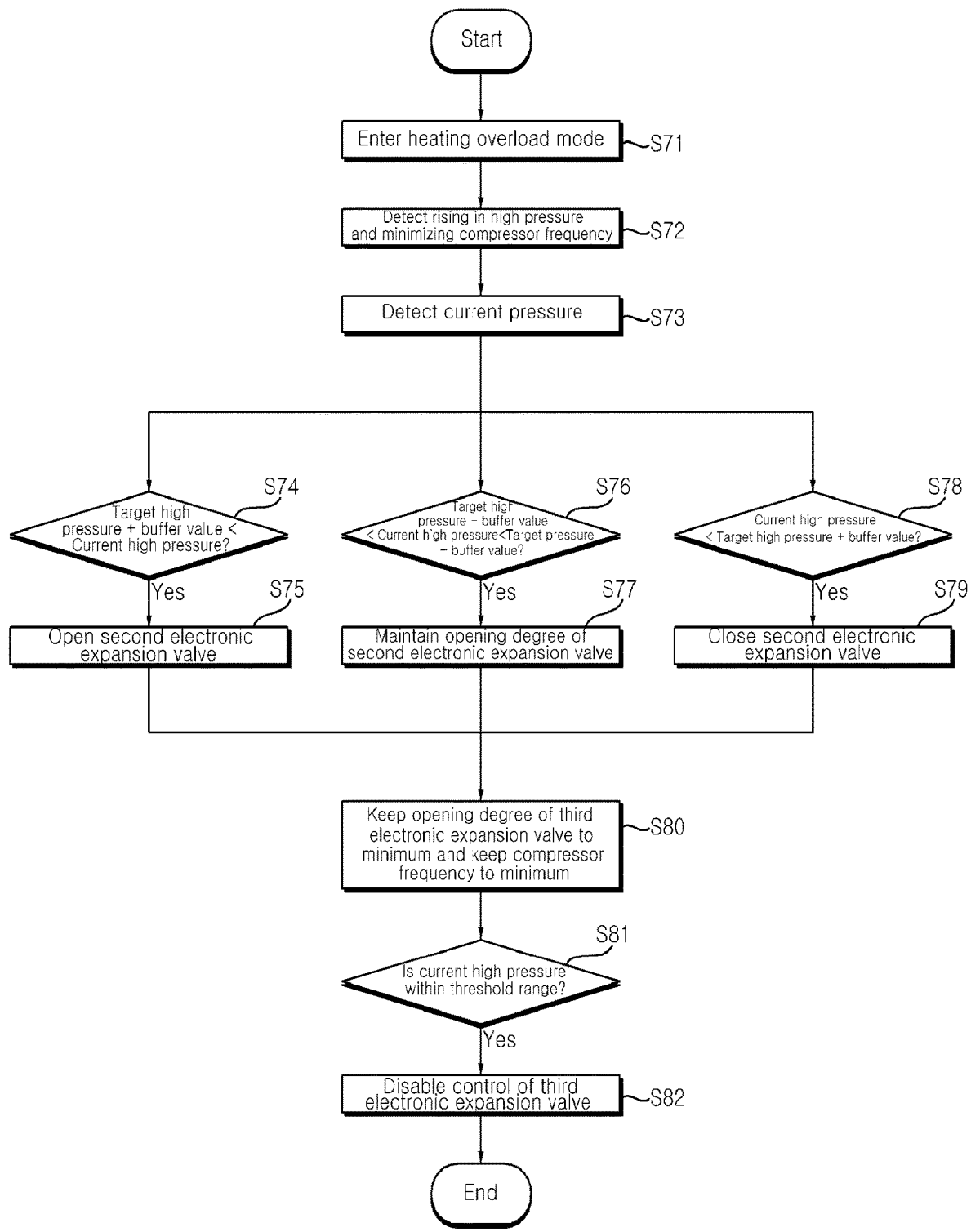
FIG. 6 is a diagram of an operational sequence of the multi-air conditioner for heating and cooling of FIG. 1 during a heating overload operation.
Figure 7:
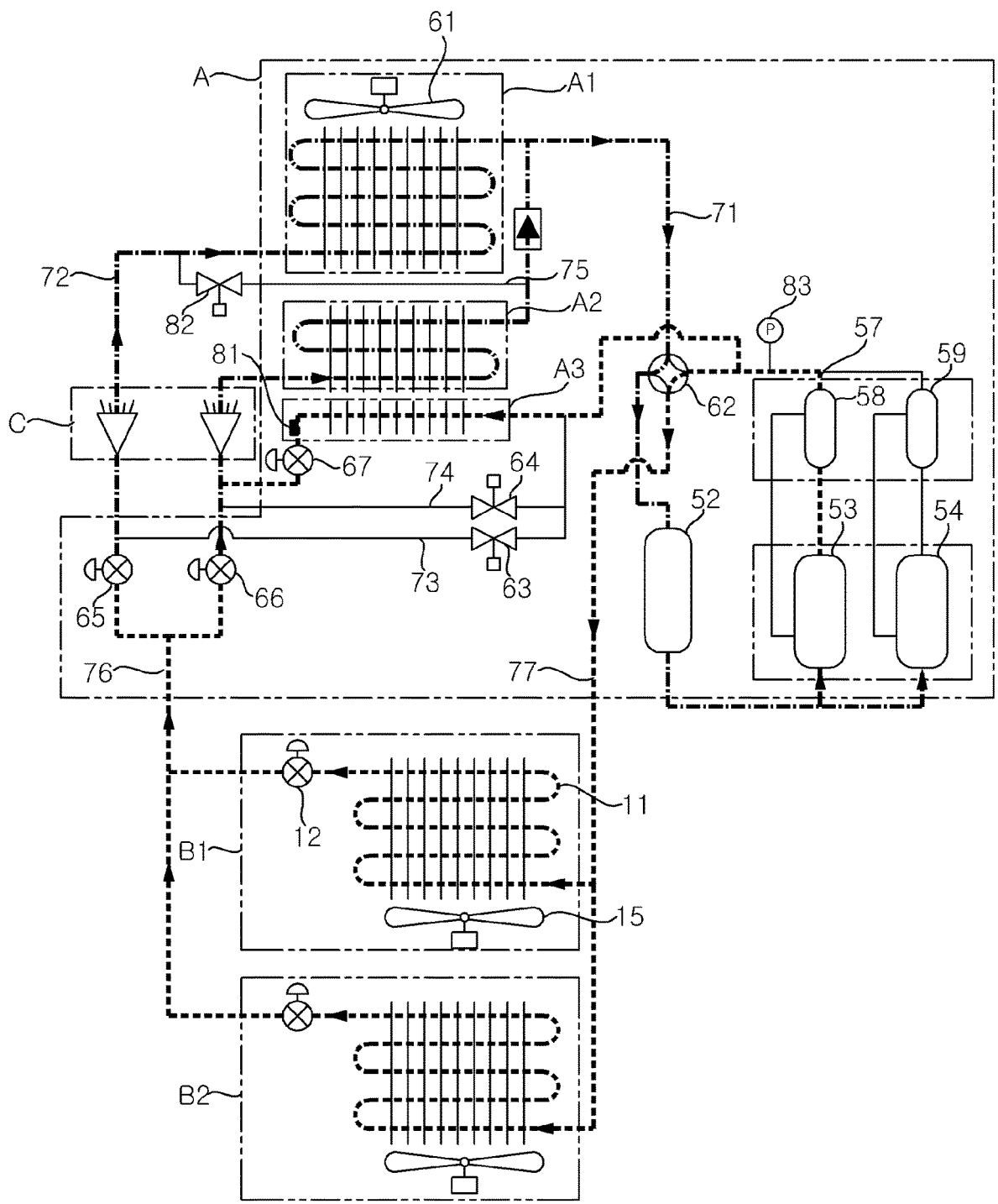
FIG. 7 is an operation diagram illustrating a state of the multi-air conditioner for heating and cooling of FIG. 1 during a heating overload operation.
Figure 8:
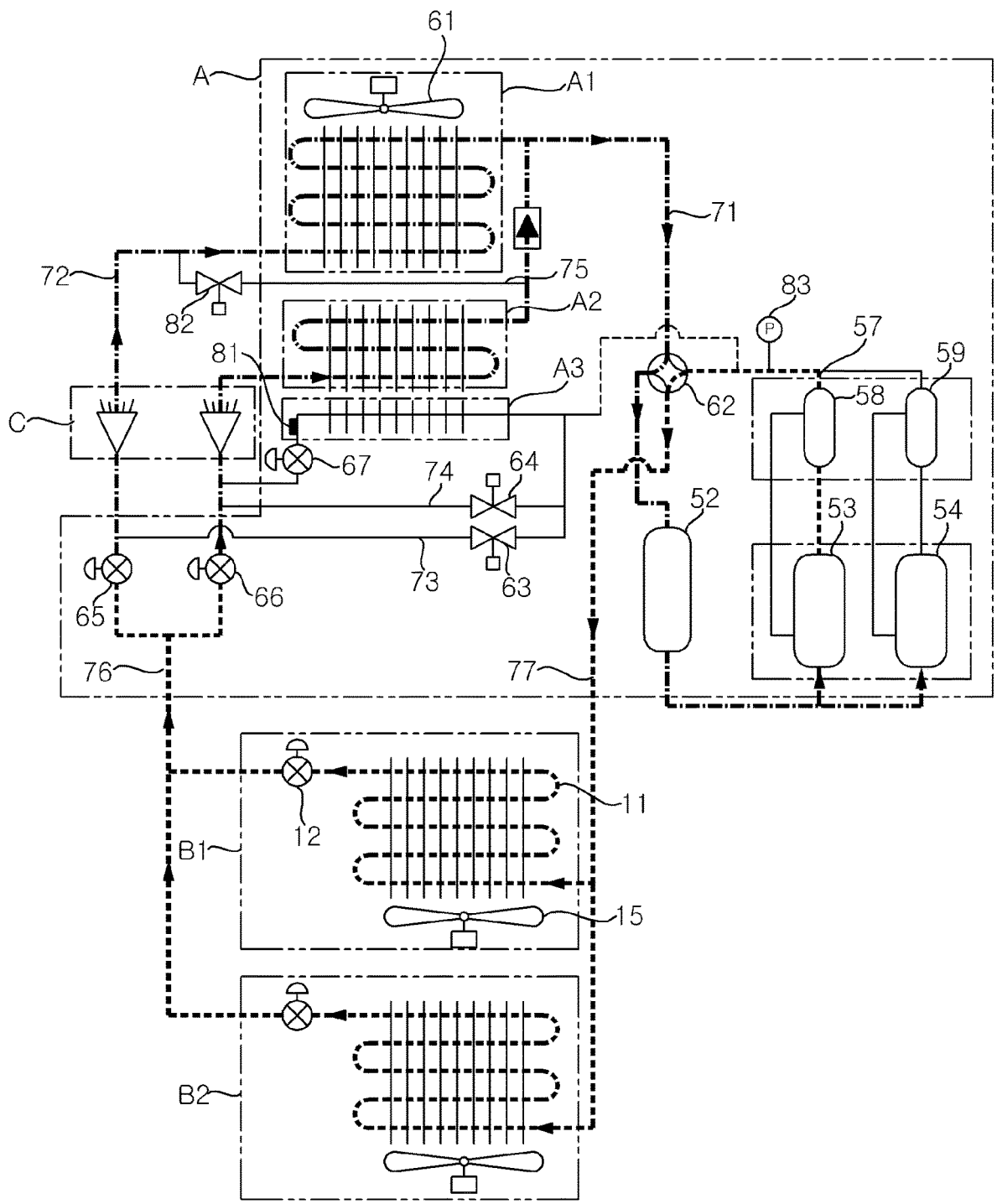
FIG. 8 is an operation diagram illustrating an operating state of the multi-air conditioner for heating and cooling of FIG. 1 during a normal heating operation.
Figure 9:
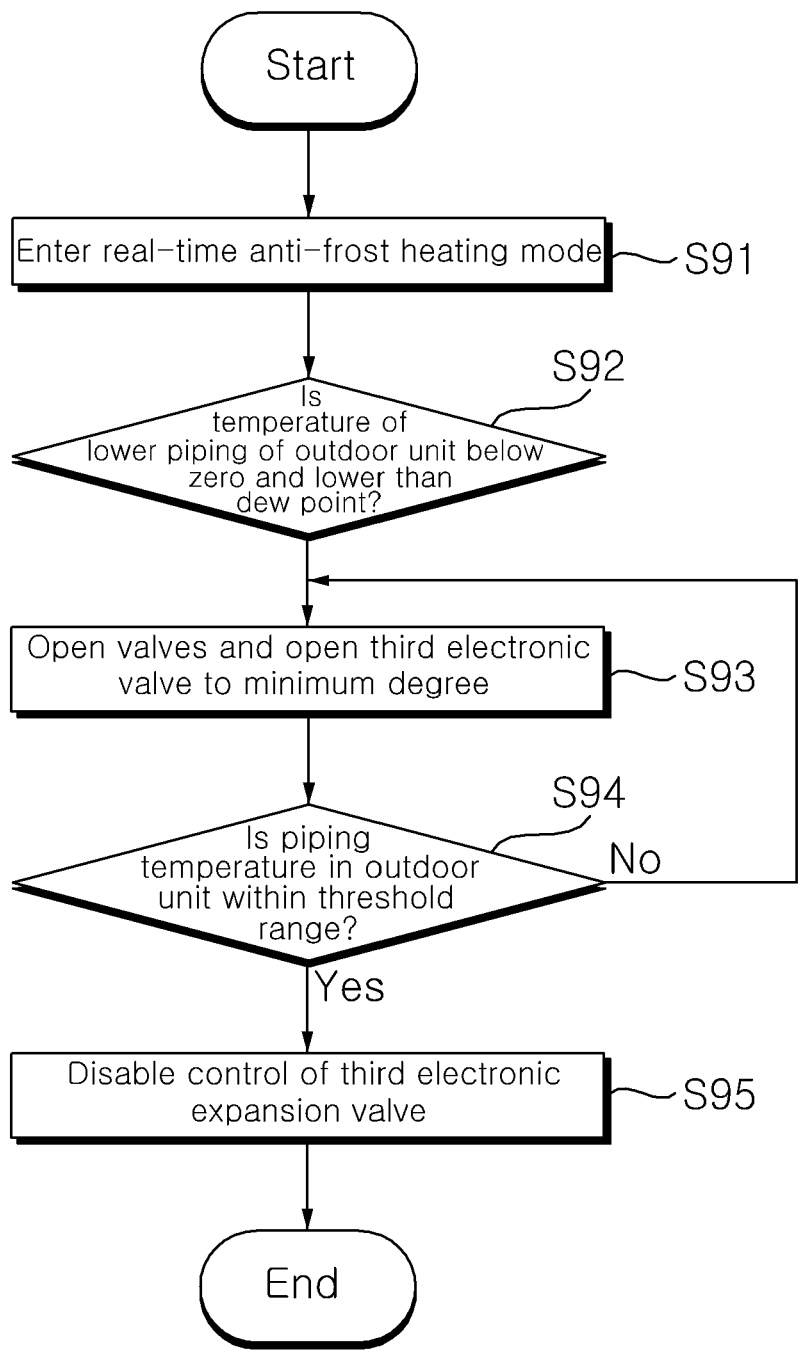
FIG. 9 is a diagram of an operational sequence of the multi-air conditioner for heating and cooling of FIG. 1 during an anti-frost continuous heating operation.
Figure 10:
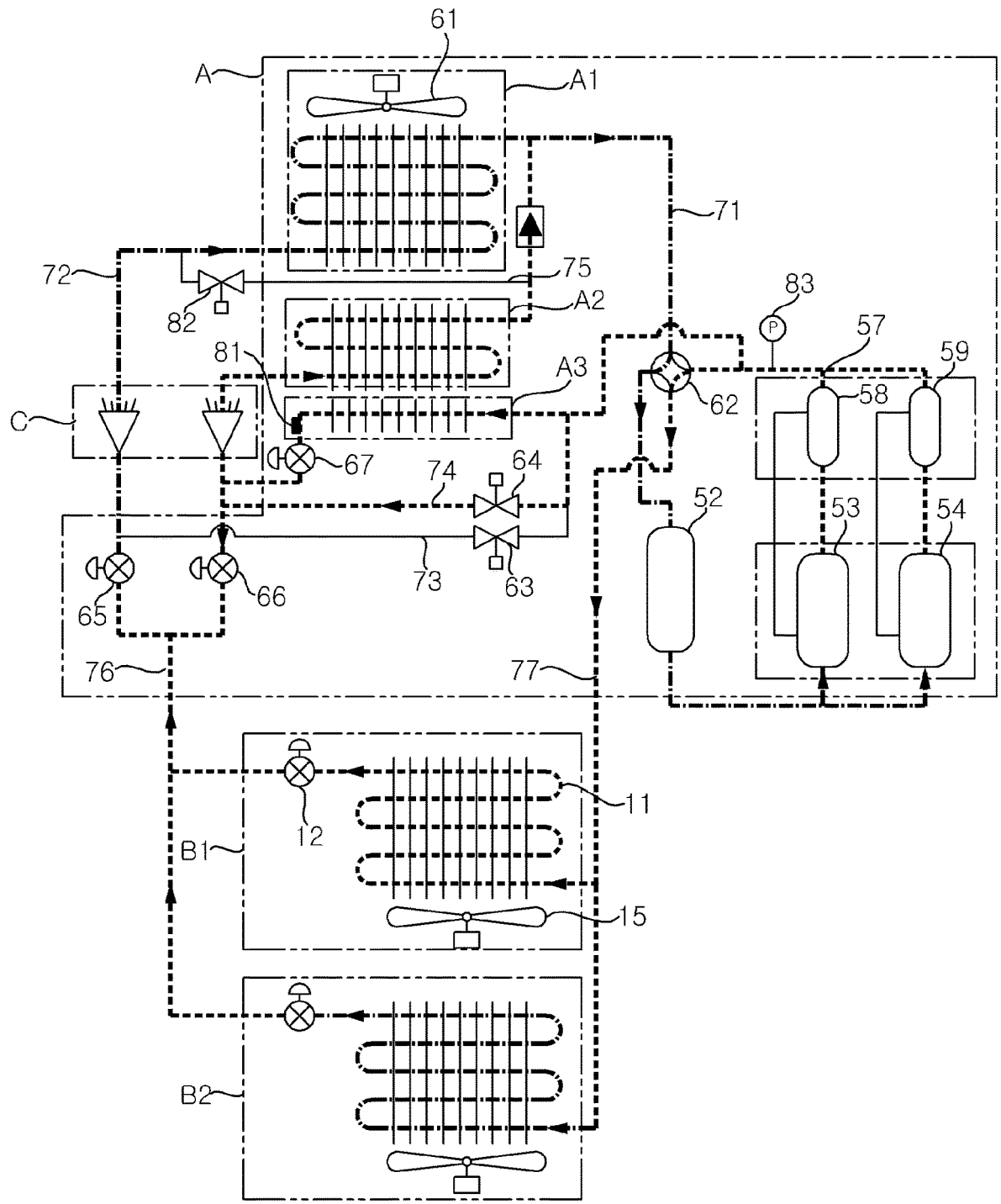
FIG. 10 is an operation diagram illustrating an operating state of the multi-air conditioner for heating and cooling of FIG. 1 during an anti-frost continuous heating operation.

If the user selects a heating operation, the controller may select a specific mode of heating operation based on the mode of operation selected by the user and the indoor and outdoor temperatures and humidity levels. FIG. 6 is a diagram of an operational sequence of the multi-air conditioner for heating and cooling of FIG. 1 during a heating overload operation. FIG. 7 is an operation diagram illustrating a state of the multi-air conditioner for heating and cooling of FIG. 1 during a heating overload operation. FIG. 8 is an operation diagram illustrating an operating state of the multi-air conditioner for heating and cooling of FIG. 1 during a normal heating operation. FIG. 9 is a diagram of an operational sequence of the multi-air conditioner for heating and cooling of FIG. 1 during an anti-frost continuous heating operation. FIG. 10 is an operation diagram illustrating an operating state of the multi-air conditioner for heating and cooling of FIG. 1 during an anti-frost continuous heating operation.

Referring to FIGS. 6 and 7, if the outdoor temperature is between 24 and 27 degrees above zero, the indoor temperature is between 25 and 27 degrees, and a predetermined number m or fewer indoor units have received a heating operation command, the controller may execute a heating overload mode operation (S71). In the heating overload mode, a predetermined number m or fewer indoor units need a heating operation, which means that the actual heating load is very low. In the heating overload mode, even if all the outdoor heat exchangers A1, A2, and A3 are used, the condensation pressure rises due to a high indoor temperature, thus making it difficult to create a cycle. Accordingly, the third heat exchanger A3 of the outdoor unit A is bypassed to prevent a rise in the high pressure of the discharged refrigerant while keeping the operating frequency of the compressors to a minimum, thereby creating a cycle (S72).

High-pressure gas refrigerant discharged from the first and second compressors 53 and 54 flows through the first and second discharge pipelines and enters the four-way valve 62 and then the indoor heat exchanger B. High-temperature, high-pressure liquid refrigerant condensed in the indoor heat exchanger B passes through the indoor electronic expansion valves 12, expands as it passes through the first and second electronic expansion valves 65 and 66, and is then introduced in parallel into the first heat exchanger A1 and second heat exchanger A2 of the outdoor unit A and exchanges heat there. Low-temperature gas refrigerant discharged to the first end of the first and second heat exchangers A1 and A2 passes through the accumulator 52 and collects at the compressors 53 and 54.

In order to prevent a cycle malfunction in the heating overload mode, the pressures at discharge ends of the compressors 53 and 54 are read from the pressure sensor 83 to control opening degrees of the third electronic expansion valve 67 and the second electronic expansion valve 66 (S73). More specifically, once in the heating overload mode, refrigerant is compressed while the operating frequency of the compressors 53 and 54 is kept at a minimum, thus increasing the pressure of the refrigerant and bringing the refrigerant into a high-pressure state.

Next, the pressures at the discharge ends of the compressors 53 and 54 are periodically read from the pressure sensor 83, and the opening degrees of the second electronic expansion valve 66 and the third electronic expansion valve 67 are controlled according to the current pressure values. If the current high pressure read during the current cycle is greater than a sum of a target high pressure and a buffer value (S74), then the controller opens the third electronic expansion valve 67 to a minimum while the second electronic expansion valve 66 is opened and bypasses refrigerant from the compressors 53 and 54 to the second heat exchanger A2 through the third heat exchanger A3 (S75). That is, if the high pressure of the refrigerant discharged from the compressors 53 and 54 is too high above a threshold range, a portion of the refrigerant introduced into the indoor unit B is bypassed to the outdoor heat exchanger A, thereby lowering the pressure of the refrigerant introduced into the indoor unit B.

In this instance, the target high pressure may be defined as a design value for the heating overload operation of the air conditioner 100, and the buffer value may be defined as a value for preventing cycle hunting. In this case, the compressors 53 and 54 are operated in the heating overload mode at a minimum frequency, for example, 12 to 15 Hz, so that they keep compressing refrigerant with the lowest possible compressibility (S80).

Next, the controller re-reads the pressures at the discharge ends of the compressors 53 and 54, and if the current pressures are within the threshold range (S81), it closes the third electronic expansion valve 67 to disable the control of the third electronic expansion valve 67 (S82). In this instance, the threshold range is defined as a design value that is smaller than the difference between the target high pressure and the buffer value and allows for continuous stable operation in the heating overload mode.

If the current high pressure is greater than the target high pressure minus the buffer value and less than the target high pressure plus the buffer value (target high pressure−buffer value<current high pressure<target high pressure+buffer value), the current high pressure is periodically read while the current opening degree of the third electronic expansion valve 67 is maintained, so as to determine whether the current high pressure is within the threshold range (S80 and S81). Next, if the current high pressure is less than the difference between the target high pressure and the buffer value, the second electronic expansion valve 66 is closed to measure the current high pressure while the flow of refrigerant between the second heat exchanger A2 and the indoor unit B is blocked. If the current high pressure is within the threshold range, the third electronic expansion valve 67 is closed to disable the control of the third electronic expansion valve 67 (S81 and S82). This allows for circulation while the high pressure of the refrigerant discharged from the compressors 53 and 54 is within the threshold range, making the refrigerant circulate in response to a very low heating load.

Next, a normal heating mode will be described in which the outdoor temperature is low and the indoor temperature is between 20 and 27 degrees as shown in FIG. 8 (S83). High-pressure gas refrigerant discharged from the first and second compressors 53 and 54 flows through the first and second discharge pipelines and enters the four-way valve 62 and then the indoor heat exchanger B. High-temperature, high-pressure liquid refrigerant condensed in the indoor heat exchanger B passes through the indoor electronic expansion valves 12 and then the first and second electronic expansion valves 65 and 66, and is then introduced in parallel into the first heat exchanger A1 and second heat exchanger A2 of the outdoor unit A and evaporates through heat exchange.

Low-temperature gas refrigerant discharged to the first end of the first and second heat exchangers A1 and A2 passes through the accumulator 52 and collects at the compressors 53 and 54. In this case, the first and second heat exchangers A1 and A2 of the outdoor unit A are operated in parallel in order to minimize pressure loss in the outdoor heat exchangers A.

Referring to FIGS. 9 and 10, an operation in a real-time anti-frost heating mode will be described hereinafter (S85). Once the user selects a heating mode, the real-time anti-frost heating mode is enabled if the outdoor temperature is low, the outdoor humidity is very high, the indoor temperature is between 20 and 27 degrees, and the operation load is high—that is, a predetermined number n or more indoor units need heating operation (S91).

For example, suppose that a heating operation is selected when the humidity is very high in the winter. In that case, the outdoor unit A operates as an evaporator as the humidity in the outdoor unit A is very high, and condensate water flows downward along the heat exchangers A1 and A2.

In this instance, if the temperature of the piping around the bypassed third heat exchanger A3 at the bottom of the outdoor unit A is 0 degree or lower and the current temperature is lower than a dew-point temperature, the condensate water may freeze. If this continues for a long time, it may lead to unstable drainage and frost growth. To prevent this issue, the real-time anti-frost heating mode may be run if temperature, humidity, and indoor load conditions are met.

More specifically, referring to FIGS. 9 and 10, when the controller enters the real-time anti-frost heating mode, it reads temperature and humidity information from the temperature sensor 81 and humidity sensor installed on lower piping of the outdoor unit A. If the temperature of the lower piping of the outdoor unit A is below zero, the controller calculates the dew-point temperature based on the current temperature and humidity in the lower piping. If the current temperature of the lower piping is lower than the calculated dew-point temperature, the controller decides that the outdoor unit A has entered a phase of dew formation, that is, a frost formation phase (S92).

The controller runs high-temperature, high-pressure refrigerant to the third heat exchanger A3 by controlling the third electronic expansion valve 67 in real time in the normal heating operation. More specifically, high-pressure gas refrigerant discharged from the first and second compressors 53 and 54 flows through the first and second discharge pipelines and enters the four-way valve 62 and then the indoor heat exchanger. High-temperature, high-pressure liquid refrigerant condensed in the indoor heat exchanger passes through the indoor electronic expansion valves 12 and then the first and second electronic expansion valves 65 and 66, and is then introduced in parallel into the first heat exchanger A1 and second heat exchanger A2 of the outdoor unit and evaporates through heat exchange. Low-temperature gas refrigerant discharged to the first end of the first and second heat exchangers A1 and A2 passes through the accumulator 52 and collects at the compressors 53 and 54.

In this instance, if the controller decides that the outdoor unit A has entered a frost formation phase, it opens the third electronic expansion valve 67 to a minimum degree and at the same time removes frost on the piping around the third heat exchanger A3 while running the high-temperature, high-pressure refrigerant from the compressors 53 and 54 to the third heat exchanger A3 (S93). The controller periodically reads the piping temperature in the outdoor unit A. If the piping temperature in the outdoor unit A rises to such an extent as to meet the threshold range (S94), it closes the third electronic expansion valve 67 to disable the control and switches to the normal heating mode (S95). In this way, it is possible to remove frost by running high-temperature, high-pressure refrigerant into the bypassed third heat exchanger A3, and to prevent a malfunction of the equipment by precluding frost formation according to outside temperature and humidity conditions.

The controller may periodically perform a defrosting operation in heating mode (S90). A defrost heating mode is enabled if the outside temperature is low between 5 degrees below zero and 1 degree above zero, the outside humidity is very high, and the indoor temperature is between 20 to 27 degrees, and the operation load of the indoor unit B is high. In this case, the cycle of operation changes from cooling to heating to perform an operation of removing frost on the outdoor heat exchangers A1, A2, and A3. That is, condensate water generated in the first and second heat exchangers A1 and A2 drops to the outdoor unit fan 61 and third heat exchanger A3 located below them, and the condensate water freezes into ice if the outside temperature is low, which may lead to buildup of frost, and, accordingly, a frost removal operation may be performed.

Figure 11:
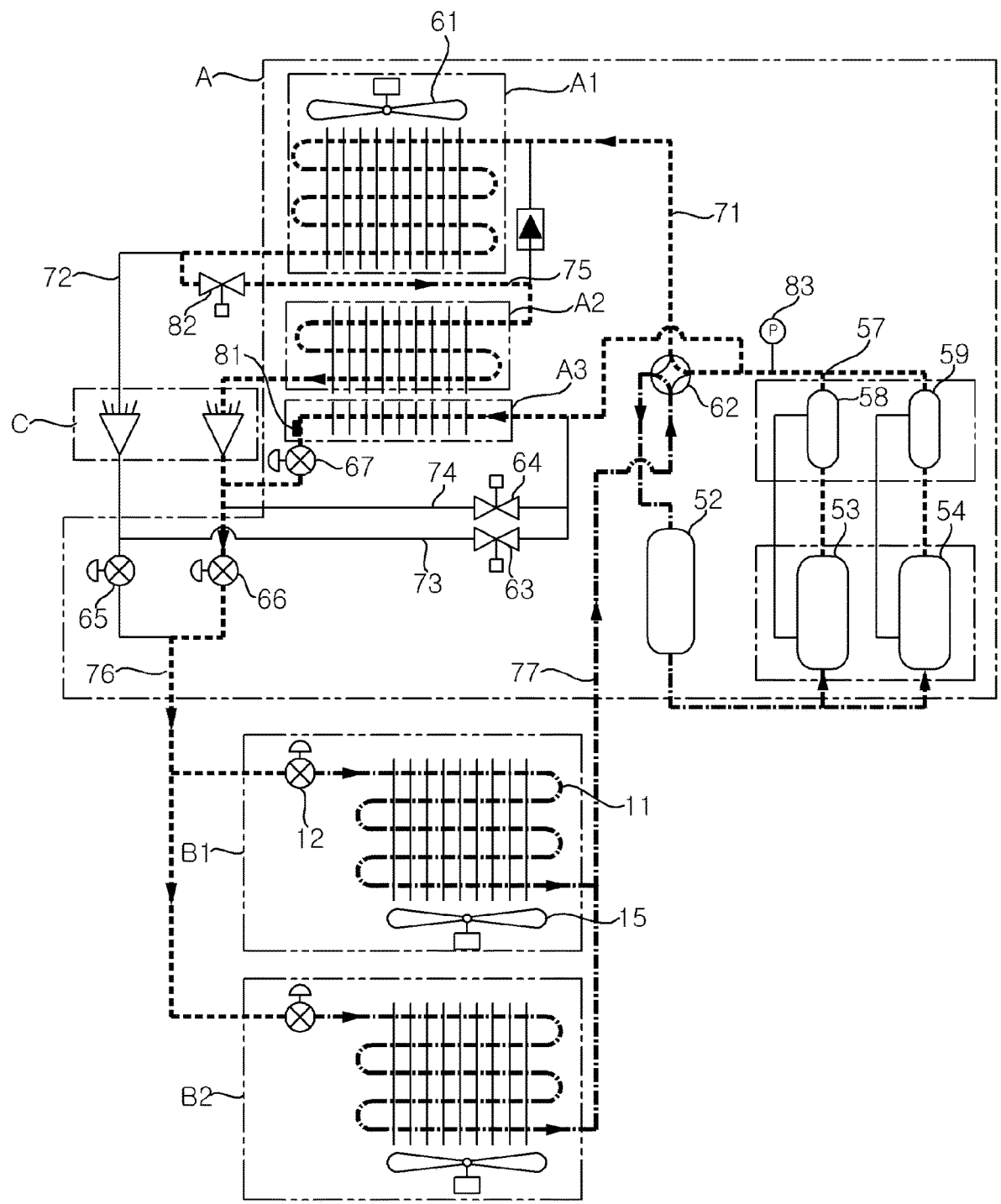
FIG. 11 is an operation diagram illustrating an operating state of the multi-air conditioner for heating and cooling of FIG. 1 during a full defrost heating operation.

Referring to FIG. 11, in a full defrost heating mode, high-pressure gas refrigerant discharged from the first and second compressors 53 and 54 flows through the first and second discharge pipelines, passes through the four-way valve 62, and enters the first heat exchanger A1 of the outdoor unit. At this point, as the first connecting valve 82 is opened, the first heat exchanger A1 and the second heat exchanger A2 are connected in series. Thus, refrigerant flowing through the first heat exchanger A1 is further condensed as it exchanges heat again in the second heat exchanger A2. The condensed high-pressure liquid refrigerant passes through the subcooling unit and then the distributor C, and refrigerant discharged through the connecting pipelines expands in the indoor electronic expansion valves 12 and then evaporates in the indoor heat exchangers 11. Next, the refrigerant in low-temperature and low-pressure state is introduced into the suction and discharge pipeline 77, passes through the accumulator 52, and is then drawn into the first and second compressors 53 and 54.

In the full defrost heating operation, the third electronic expansion valve 67 at the bottom is opened so that refrigerant is directed to flow to the third heat exchanger A3, and at the same time, refrigerant from the compressors 53 and 54 passes through the third heat exchanger A3 and enters the indoor unit B. In this instance, the third electronic expansion valve 67 may be fully opened to provide enough heat to prevent a buildup of frost on the third heat exchanger A3 during the defrosting operation.

Figure 12A:
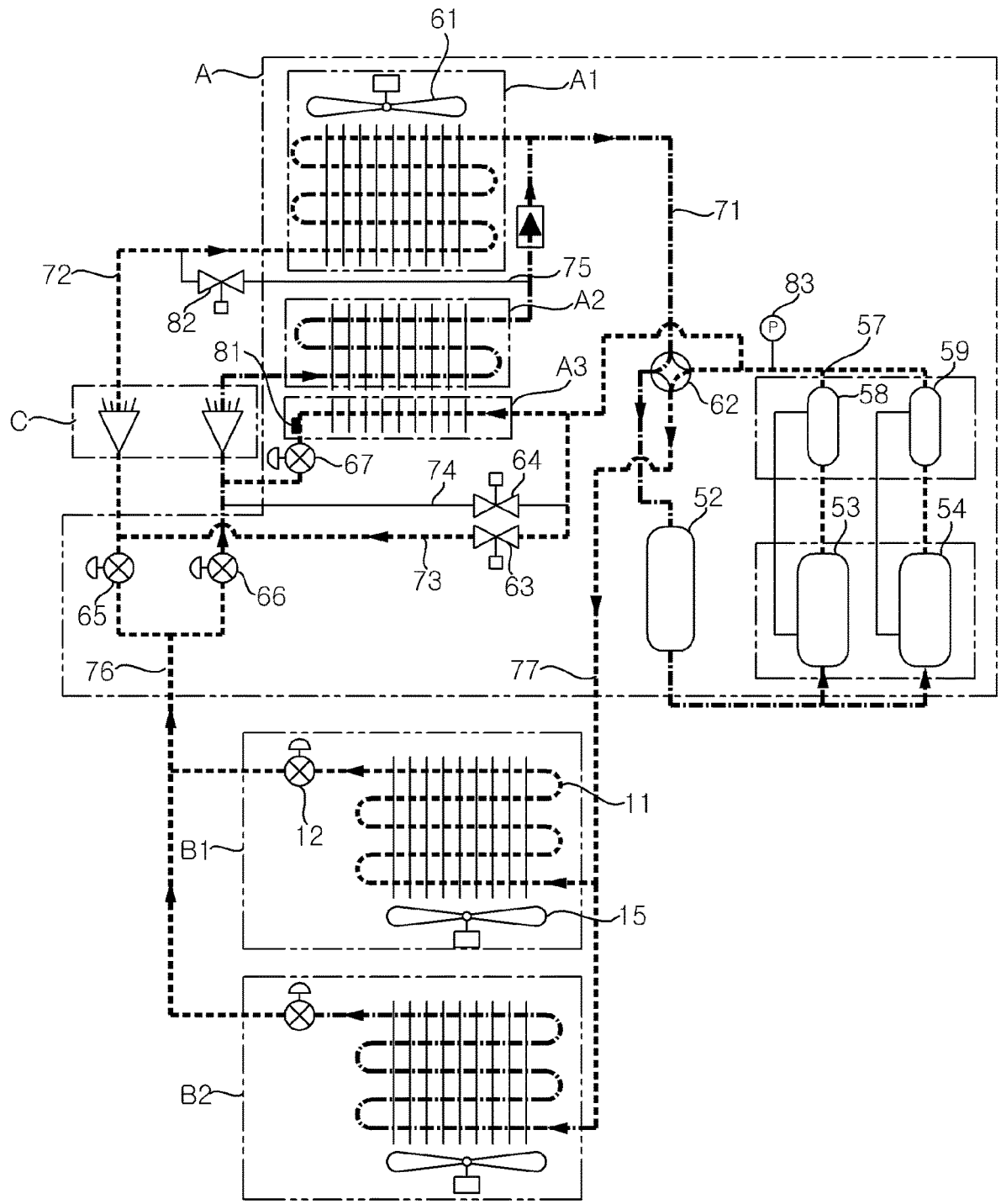
FIGS. 12A and 12B are operation diagrams illustrating an operating state of the multi-air conditioner for heating and cooling of FIG. 1 during a split defrost heating operation.
Figure 12B:
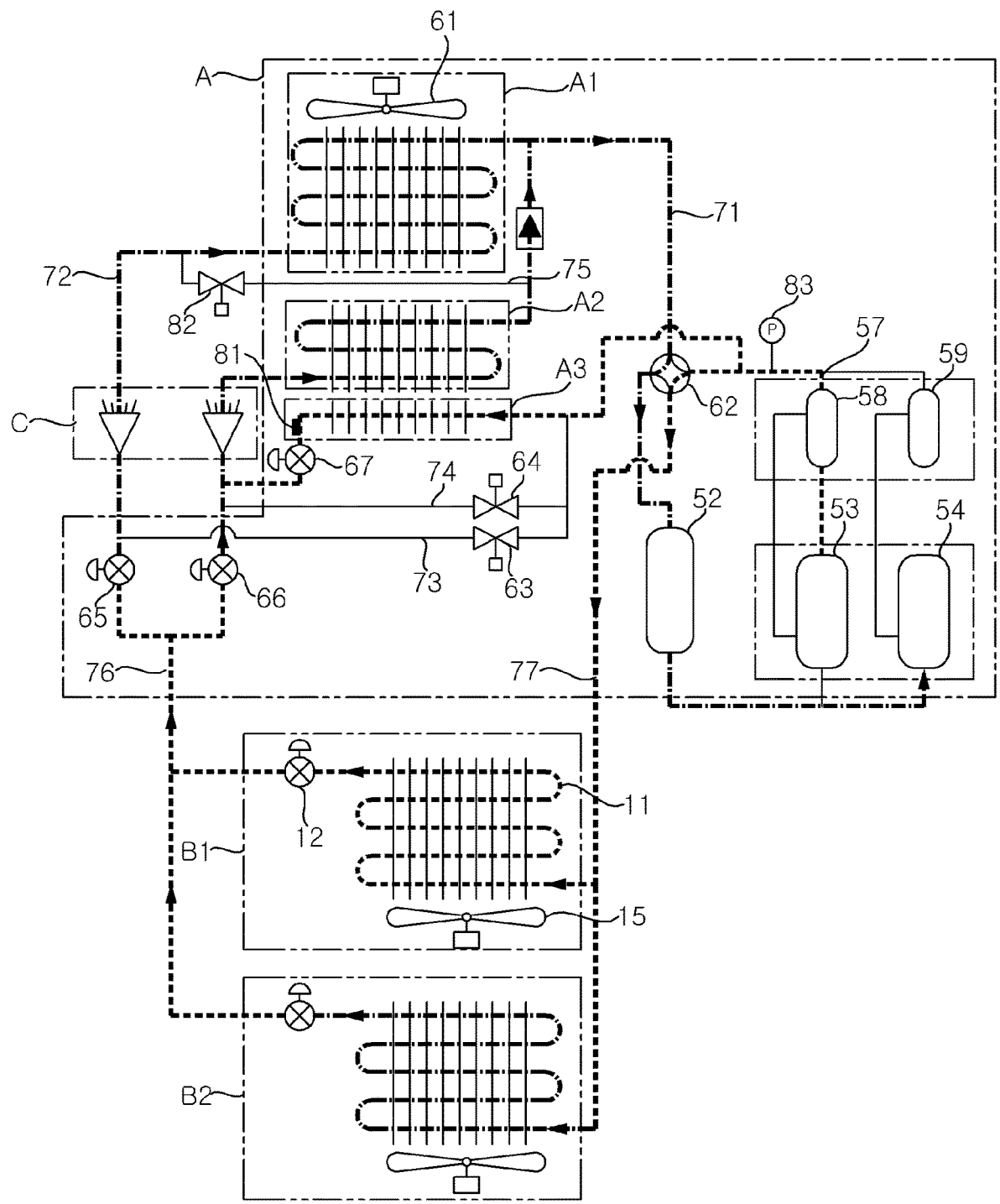

Next, a split defrosting operation shown in FIG. 12A-12B will be described (S99). That is, in the case of split defrosting, the outdoor heat exchangers A1, A2, and A3 are divided into upper and lower portions that are alternately defrosted while the heating operation continues.

Defrosting of the lower portion will be described with reference to FIG. 12A. High-pressure gas refrigerant discharged from the first and second compressors 53 and 54 flows through the first and second discharge pipelines and enters the four-way valve 62 and then the indoor heat exchanger B. High-temperature, high-pressure liquid refrigerant condensed in the indoor heat exchanger B passes through the indoor electronic expansion valves 12 and then the first electronic expansion valve 65, and is then introduced into the first heat exchanger A1 of the outdoor unit A and evaporates through heat exchange, thereby achieving a heating cycle operation. Low-temperature gas refrigerant discharged to the first end of the first heat exchanger A1 passes through the accumulator 52 and collects at the compressors 53 and 54.

At this point, the second electronic expansion valve 66 is closed for defrosting of the lower portion and blocks the flow of refrigerant from the indoor unit B to the second heat exchanger A2 of the outdoor unit A. Defrosting of the second heat exchanger A2 may be performed by opening the second connecting valve 64 located below it. More specifically, as high-temperature, high-pressure refrigerant discharged from the compressors 53 and 54 passes through the third heat exchanger A3 and flows through the third electronic expansion valve 67, a portion of the refrigerant passes through the second sub pipeline 74, removes frost on the second heat exchanger A2, and then passes through the accumulator 52 and collects at the compressors 53 and 54.

The third electronic expansion valve 67 may be fully opened to provide enough heat to prevent a buildup of frost on the second heat exchanger A2 during the defrosting operation. Defrosting of the upper portion will be described with reference to FIG. 12B. High-pressure gas refrigerant discharged from the first and second compressors 53 and 54 flows through the first and second discharge pipelines and enters the four-way valve 62 and then the indoor heat exchanger B. High-temperature, high-pressure liquid refrigerant condensed in the indoor heat exchanger B passes through the indoor electronic expansion valves 12 and then the second electronic expansion valve 66, and is then introduced into the second heat exchanger A2 of the outdoor unit A and evaporates through heat exchange, thereby achieving a heating cycle operation. Low-temperature gas refrigerant discharged to the first end of the second heat exchanger A2 passes through the accumulator 52 and collects at the compressors 53 and 54.

At this point, the first electronic expansion valve 65 is closed and blocks the flow of refrigerant from the indoor unit B to the first heat exchanger A1 of the outdoor unit A. Defrosting of the first heat exchanger A1 may be performed by opening the first connecting valve 63 located below it. More specifically, as refrigerant discharged from the compressors 53 and 54 passes through the third heat exchanger A3 and flows through the third electronic expansion valve 67, a portion of the refrigerant passes through the first sub pipeline 73, removes frost on the first heat exchanger A1, and then passes through the accumulator 52 and collects at the compressors 53 and 54. The third electronic expansion valve 67 may be fully opened to provide enough heat to prevent a buildup of frost on the first heat exchanger A1 during the defrosting operation.

With the heat exchangers A1, A2, and A3 forming a multi-layered structure within a single outdoor unit A, it is possible to implement continuous heating as a portion of the heat exchangers A1, A2, and A3 at some layers functions as evaporators for the heating operation and the rest at the other layer performs a defrost mode. As such, normal heating may be implemented by defrosting the upper and lower portions alternately.

In this way, the outdoor heat exchangers A1, A2, and A3 have a multi-layered structure in which they are coupled to or decoupled from each other and a heat exchanger for bypass is provided at the bottom, whereby various modes of operation may be possible according to outdoor and indoor conditions and depending on the load of the indoor unit B.

Figure 13:
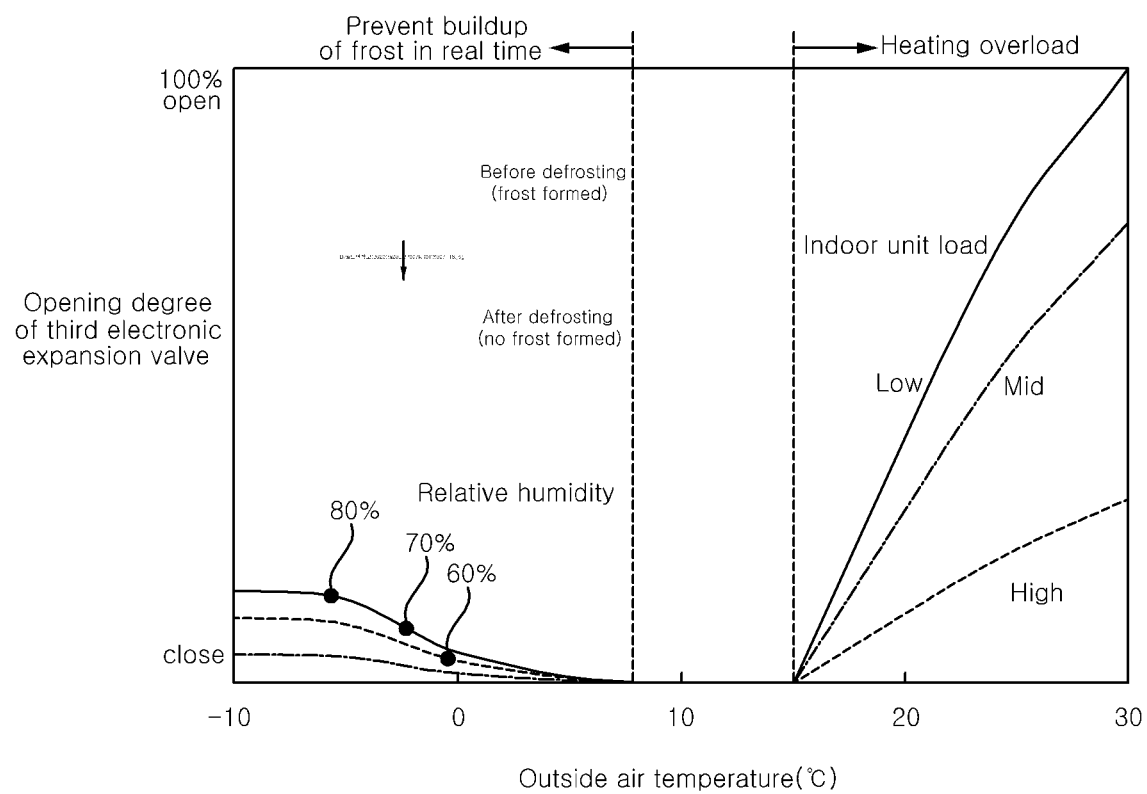
FIG. 13 is a graph showing an opening degree of a bypass valve relative to outdoor unit temperature, relative humidity, and indoor unit load.

FIG. 13 is a graph showing an opening degree of the third electronic expansion valve relative to outdoor unit temperature, relative humidity, and indoor unit load. As shown in FIG. 13, when defrosting needs to be carried out during the heating operation because the outside air temperature is low and the humidity is high, a defrosting operation is enabled to prevent buildup of frost in real time by controlling the opening degree of the third electronic expansion valve 67 of the third heat exchanger A3. That is, as the temperature lowers and the humidity increases, the opening degree may be increased to effectively prevent freezing of the outdoor unit A.

In the photos of before and after the defrosting operation, the "before defrosting operation" shows frozen lower piping of a solely connected heat exchanger, not of a layered structure of outdoor heat exchangers A that can be coupled and decoupled. The "after defrosting operation" shows a layered structure of outdoor heat exchangers A that can be coupled and decoupled, after being defrosted by operating the third heat exchanger A3 and the third electronic expansion valve 67.

As in the photos of FIG. 13, it can be observed that the lower piping has been defrosted. Moreover, if the outside temperature is very high and thus the indoor unit load for heating is very low, the heating overload mode is enabled to increase the opening degree of the third electronic expansion valve 67 and lower refrigerant pressure accordingly, thereby regulating refrigerant circulation to meet the required load. Therefore, it is possible to run a seamless heating cycle and minimize refrigerant leakage.

Embodiments disclosed herein provide a multi-layered heat exchanger structure capable of selectively coupling and decoupling outdoor heat exchangers depending on an indoor cooling or heating load by forming them in a multi-layered structure within a single outdoor unit. Embodiments disclosed herein further provide a multi-layered heat exchanger structure capable of minimizing an amount of refrigerant leakage indoors by collecting and running refrigerant remaining in a high-pressure liquid pipe.

Embodiments disclosed herein provide a smart heat exchanger that selects an optimal mode for current indoor and outdoor temperatures and humidity levels when the user selects a mode of operation, thereby minimizing refrigerant leakage throughout the entire mode. Embodiments disclosed herein also provide a multi-layered heat exchanger structure capable of minimizing refrigerant leakage as an outlet of a compressor and one end of the outdoor unit are bypassed for various modes using a heat exchanger for bypass and an electronic expansion valve for bypass at a bottom of the outdoor unit.

Embodiments disclosed herein additionally provide a multi-layered heat exchanger structure capable of bypassing so as to prevent an increase in a discharge pressure of the compressor in a case in which no cycle is created due to the discharge pressure of the compressor being too high under a heating overload condition, for example, when a heating load is very low. Embodiments disclosed herein provide a multi-layered heat exchange structure capable of performing real-time monitoring and corresponding valve control to prevent defrosting and frost formation during heating mode.

Embodiments disclosed herein provide a multi-air conditioner for heating and cooling that may include at least one indoor unit for both cooling and heating including an indoor heat exchanger; an outdoor unit for both cooling and heating including a compressor, a plurality of outdoor heat exchangers, and a switching unit disposed on a discharge side of the compressor to switch a flow of refrigerant; and a distributor disposed between the outdoor unit for both cooling and heating and the at least one indoor unit for both cooling and heating, that distributes the refrigerant, The plurality of outdoor heat exchangers in the outdoor unit for both cooling and heating may include a first heat exchanger, one or a first end of which is connected to the switching unit, and the other or a second end of which is connected to the distributor; a second heat exchanger disposed under the first heat exchanger, one or a first end of which is couplable to or decouplable from the other end of the first heat exchanger, and the other or a second end of which is connected to the distributor; and a third heat exchanger disposed under the second heat exchanger, one or a first end of which is connected to the discharge side of the compressor, and the other or a second end of which is connected to the indoor unit.

The outdoor unit may further include a first connecting pipeline that connects the other end of the first heat exchanger and one end of the second heat exchanger in series, and a first connecting valve disposed on the first connecting pipeline, that couples or decouples the first heat exchanger and the second heat exchanger. The outdoor unit for both cooling and heating may have a first expansion valve, a second expansion valve, and a third expansion valve on the other end of the first heat exchanger, the second heat exchanger, and the third heat exchanger, respectively, in order to perform a specific mode of operation depending on indoor and outdoor temperatures and humidity levels based on a mode of operation selected by the user.

The heat exchangers forming a multi-layered structure within the outdoor unit may have variable flow path lengths and capacities so that a capacity of the outdoor unit meets different indoor unit loads for a variety of specific modes of operation. More specifically, the first heat exchanger may have a longer flow path than the second heat exchanger. The third heat exchanger may have a shorter flow path than the second heat exchanger. The flow path of the first heat exchanger may take up 65 to 75% of the entire flow paths of the plurality of outdoor heat exchangers.

The multi-air conditioner may select a specific mode of operation by putting together a mode of operation selected by a user and current status information. The current status information may include an indoor temperature and humidity, an outdoor temperature and humidity, and a load of the indoor unit.

If the mode of operation selected by the user is a cooling operation, a capacity of the plurality of outdoor heat exchangers may be varied depending on the outdoor temperature and the load of the indoor unit, among the current status information. The first through third heat exchangers may be controlled to be coupled to or decoupled such that the lower the outdoor temperature and the lower the load of the indoor unit, the lower the capacity of the plurality of outdoor heat exchangers gets. If the indoor unit load is lowest, only the third heat exchanger may be operated to create a cooling cycle.

If the mode of operation selected by the user is a heating operation, refrigerant flowing toward the third heat exchanger, among the plurality of outdoor heat exchangers, may be bypassed or blocked depending on the outdoor temperature, the outdoor humidity, and the load of the indoor unit, among the current status information. By reducing the pressure of the refrigerant discharged from the compressor using the third heat exchanger, an excessive amount of refrigerant may be stopped from entering when the heating load is very low, thereby creating a cycle without refrigerant leakage. More specifically, when the mode of operation selected by the user is the heating operation, if the outdoor temperature is at or above a first temperature and the load of the indoor unit is m or fewer indoor units, a heating overload mode may be enabled in which a current pressure is lowered by controlling the second expansion valve and the third expansion valve based on the current pressure of the refrigerant discharged to the discharge side of the compressor.

The outdoor unit for both cooling and heating may further include a pressure sensor that periodically reads the pressure at the discharge side of the compressor, and a temperature sensor disposed on the other end of the third heat exchanger, that periodically reads piping temperatures. If the current pressure periodically read by the pressure sensor is within a threshold range, the third expansion valve may be closed to switch to a normal heating mode.

Among a variety of specific modes of operation according to embodiments disclosed herein, an anti-frost mode may be enabled in which frost formation on the outdoor unit is prevented based on the outdoor temperature and humidity. Such an anti-frost mode may be enabled by the third heat exchanger at the bottom which is a bypass heat exchanger.

When the mode of operation selected by the user is the heating operation, if the outdoor temperature is at or above a second temperature, the outdoor humidity is above a first range, and the load of the indoor unit is n or more indoor units, an anti-frost mode may be enabled in which frost is removed by controlling the third expansion valve to run the refrigerant discharged to the discharge side of the compressor to the third heat exchanger. In the anti-frost mode, the piping temperature may be periodically read from the temperature sensor of the third heat exchanger, and if the piping temperature is within a threshold range, the third expansion valve may be closed to switch to normal heating mode.

The outdoor unit for both cooling and heating may further include a first sub pipeline that connects the one end of the third heat exchanger and the other end of the first heat exchanger; a second sub pipeline that connects the one end of the third heat exchanger and the second heat exchanger; a first sub valve disposed on the first sub pipeline, that turns on or off a flow of refrigerant to the first sub pipeline; and a second sub valve disposed on the second sub pipeline, that turns on or off a flow of refrigerant to the second sub pipeline.

When the multi-air conditioner for heating and cooling is in a defrosting operation, a defrost continuous heating mode is enabled in which a lower portion defrost mode and an upper portion defrost mode alternate. The lower portion defrost mode includes defrosting the second heat exchanger by directing refrigerant discharged from the compressor to the second and third heat exchangers while the refrigerant evaporates in the first heat exchanger, and the upper portion defrost mode includes defrosting the first heat exchanger by directing the refrigerant discharged from the compressor to the first and third heat exchangers while the refrigerant evaporates in the second heat exchanger. When the multi-air conditioner is in the defrost continuous heating mode, the third expansion valve may be fully opened.

Through the above solution, embodiments disclosed herein allow for selectively coupling and decoupling outdoor heat exchangers depending on indoor cooling or heating load by forming them in a multi-layered structure and also minimizes an amount of refrigerant leakage indoors by collecting and running a refrigerant remaining in a high-pressure liquid pipe. Moreover, it is possible to provide a smart heat exchanger that selects an optimal mode for current indoor and outdoor temperatures and humidity levels when the user selects a mode of operation, thereby enabling operation with minimum refrigerant leakage throughout the entire mode.

Embodiments disclosed herein may minimize refrigerant leakage as an outlet of a compressor and one end of the outdoor unit are bypassed for various modes using a heat exchanger for bypass and an electronic expansion valve for bypass at the bottom of the outdoor unit. In addition, bypassing may be performed so as to prevent an increase in the discharge pressure of the compressor in a case in which no cycle is created due to the discharge pressure of the compressor being too high under a heating overload condition, for example, when a heating load is very low, and real-time monitoring and corresponding valve control may be performed to prevent defrosting and frost formation during heating mode.

While embodiments have been illustrated and described above, the embodiments are not limited to the aforementioned specific exemplary embodiments, various modifications may be made by a person with ordinary skill in the art to which the embodiments pertain without departing from the subject matter claimed in the claims, and these modifications should not be appreciated individually from the technical spirit or prospect.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multi-air conditioner for heating and cooling, comprising:
at least one indoor unit for both cooling and heating comprising an indoor heat exchanger;
an outdoor unit for both cooling and heating comprising a compressor, a plurality of outdoor heat exchangers, and a four-way valve disposed on a discharge side of the compressor to switch a flow of a refrigerant; and
a distributor disposed between the outdoor unit and the at least one indoor unit, that distributes the refrigerant, wherein the plurality of outdoor heat exchangers comprises:
a first heat exchanger, a first end of which is connected to the four-way valve, and a second end of which is connected to the distributor;
a second heat exchanger disposed under the first heat exchanger, a first end of which is configured to be coupled to or decoupled from the second end of the first heat exchanger, and a second end of which is connected to the distributor;
a third heat exchanger disposed under the second heat exchanger, a first end of which is connected to the discharge side of the compressor, and a second end of which is connected to the at least one indoor unit;
a first connecting pipeline that connects the second end of the first heat exchanger and the first end of the second heat exchanger in series;
a first connecting valve disposed on the first connecting pipeline, that switches on or off a mechanical connection between the first heat exchanger and the second heat exchanger; and
a first expansion valve, a second expansion valve, and a third expansion valve on the second end of the first heat exchanger, the second heat exchanger, and the third heat exchanger, respectively, wherein the multi-air conditioner selects a specific mode of operation by putting together a mode of operation selected by a user and current status information, wherein when the mode of operation selected by the user is a heating operation, if an outdoor temperature is at or below a first temperature, an outdoor humidity is above a predetermined range, and a load of the at least one indoor unit is at or above a predetermined value, an anti-frost mode is enabled in which frost due to condensate dropping from the first and second heat exchangers is prevented from forming by controlling the third expansion valve to direct the refrigerant discharged to the discharge side of the compressor to the third heat exchanger, wherein the outdoor unit further comprises:
a first sub pipeline that connects the first end of the third heat exchanger and the second end of the first heat exchanger;
a second sub pipeline that connects the first end of the third heat exchanger and the second end of the second heat exchanger;
a first sub valve disposed on the first sub pipeline, that turns on or off a flow of the refrigerant to the first sub pipeline; and
a second sub valve disposed on the second sub pipeline, that turns on or off a flow of the refrigerant to the second sub pipeline, wherein when the multi-air conditioner is in a defrosting operation, a defrost continuous heating mode is enabled in which a lower portion defrost mode and an upper portion defrost mode alternate, wherein the lower portion defrost mode comprises defrosting the second heat exchanger by running the refrigerant discharged from the compressor to the second heat exchanger and the third heat exchanger while the refrigerant evaporates in the first heat exchanger, wherein the upper portion defrost mode comprises defrosting the first heat exchanger by running the refrigerant discharged from the compressor to the first heat exchanger and the third heat exchanger while the refrigerant evaporates in the second heat exchanger, wherein when the multi-air conditioner is in the defrost continuous heating mode, the third expansion valve is fully opened, and wherein when the multi-air conditioner is in the anti-frost mode, the third expansion valve is opened to a minimum degree.

2. The multi-air conditioner for heating and cooling of claim 1, wherein the first heat exchanger has a longer flow path than a flow path of the second heat exchanger.

3. The multi-air conditioner for heating and cooling of claim 1, wherein the third heat exchanger has a shorter flow path than a flow path of the second heat exchanger.

4. The multi-air conditioner for heating and cooling of claim 1, wherein a flow path of the first heat exchanger takes up 65 to 75% of an entire flow path of the plurality of outdoor heat exchangers.

5. The multi-air conditioner for heating and cooling of claim 1, wherein the current status information comprises an indoor temperature, an indoor humidity, the outdoor temperature, the outdoor humidity, and the load of the at least one indoor unit.

6. The multi-air conditioner for heating and cooling of claim 5, wherein if the mode of operation selected by the user is a cooling operation, a capacity of the plurality of outdoor heat exchangers is varied based on the outdoor temperature and the load of the at least one indoor unit, among the current status information.

7. The multi-air conditioner for heating and cooling of claim 6, wherein the first heat exchanger, the second heat exchanger, and the third heat exchanger are controlled to be coupled to or decoupled such that the lower the outdoor temperature and the lower the load of the at least one indoor unit, the lower a capacity of the plurality of outdoor heat exchangers gets.

8. The multi-air conditioner for heating and cooling of claim 7, wherein if the load of the at least one indoor unit is less than a first threshold value, only the third heat exchanger is operated to create a cooling cycle.

9. The multi-air conditioner for heating and cooling of claim 5, wherein if the mode of operation selected by the user is the heating operation, refrigerant flowing to the third heat exchanger, among the plurality of outdoor heat exchangers, is bypassed or blocked based on the outdoor temperature, the outdoor humidity, and the load of the at least one indoor unit, among the current status information.

10. The multi-air conditioner for heating and cooling of claim 9, wherein the outdoor unit further comprises:

a pressure sensor that periodically reads a pressure at the discharge side of the compressor; and a temperature sensor disposed on the second end of the third heat exchanger, that periodically reads piping temperatures.

11. The multi-air conditioner for heating and cooling of claim 10, wherein when the mode of operation selected by the user is the heating operation, if the outdoor temperature is at or above a second temperature and the load of the at least one indoor unit is less than a second threshold value, a heating overload mode is enabled in which a current pressure is lowered by controlling the second expansion valve and the third expansion valve based on a current pressure of the refrigerant discharged to the discharge side of the compressor.

12. The multi-air conditioner for heating and cooling of claim 11, wherein if the current pressure periodically read by the pressure sensor is within a threshold range, the third expansion valve is closed to switch to a normal heating mode.

13. The multi-air conditioner for heating and cooling of claim 1, wherein, in the anti-frost mode, a temperature is periodically read from a temperature sensor of the third heat exchanger, and if the temperature is within a threshold range, the third expansion valve is closed to switch to a normal heating mode.

* * * * *